(12) United States Patent
Kim et al.

(10) Patent No.: US 9,793,740 B2
(45) Date of Patent: Oct. 17, 2017

(54) APPARATUS AND METHOD FOR CHARGE CONTROL IN WIRELESS CHARGING SYSTEM

(71) Applicants: Samsung Electronics Co., Ltd., Suwon-si (KR); IUCF-HYU (Industry-University Cooperation Foundation Hanyang University), Seoul (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Young Jin Moon, Gwangju (KR); Yun Kwon Park, Dongducheon-si (KR); Keum Su Song, Seoul (KR); Chi Hyung Ahn, Suwon-si (KR); Young Ho Ryu, Yongin-si (KR); Chang Sik Yoo, Seoul (KR); Chang Wook Yoon, Seoul (KR); Jin Sung Choi, Seoul (KR)

(73) Assignees: Samsung Electronics Co., Ltd., Suwon-si (KR); IUCF-HYU(Industry-University Cooperation Foundation Hanyang University), Seoul (KR)

( * ) Notice: Subject to any disclaimer, the term of this patent is extended or adjusted under 35 U.S.C. 154(b) by 398 days.

(21) Appl. No.: 14/089,112

(22) Filed: Nov. 25, 2013

(65) Prior Publication Data
US 2014/0152251 A1    Jun. 5, 2014

(30) Foreign Application Priority Data

Nov. 26, 2012  (KR) .......................... 10-2012-0134348
Nov. 20, 2013  (KR) .......................... 10-2013-0141479

(51) Int. Cl.
*H02J 7/00*  (2006.01)
*H02J 7/02*  (2016.01)

(52) U.S. Cl.
CPC ............... *H02J 7/025* (2013.01); *H02J 7/022* (2013.01)

(58) Field of Classification Search
USPC ........................................................ 320/108
See application file for complete search history.

(56) References Cited

U.S. PATENT DOCUMENTS 6,223,025 B1    4/2001  Tsukuda
6,791,419 B1    9/2004  Moller et al.
(Continued)

FOREIGN PATENT DOCUMENTS

KR    2000-0061787 A    10/2000
KR    10-2006-0007783 A    1/2006
(Continued)

*Primary Examiner* — Mohammed Alam
(74) *Attorney, Agent, or Firm* — NSIP Law

(57) ABSTRACT

An apparatus and a method for charge control are provided. The apparatus for charge control may include an integrated direct current-to-direct current (DC/DC) converter configured to step up an output voltage level of a load to be greater than or equal to a supply voltage level set in a power amplifier, and the power amplifier configured to convert a direct current (DC) voltage stepped up by the integrated DC/DC converter into an alternating current (AC) voltage based on a resonant frequency, and to amplify the converted AC voltage. The apparatus for charge control may include a rectification unit configured to convert an AC power received wirelessly into a DC power; and a DC/DC converter configured to step down a voltage level of the DC power to a voltage level required by a load in the receiving mode.

15 Claims, 33 Drawing Sheets

(56) References Cited

U.S. PATENT DOCUMENTS

| | | | |
|---|---|---|---|
| 2005/0064830 A1 | 3/2005 | Grigore | |
| 2010/0259108 A1* | 10/2010 | Giler | B60L 11/182 307/104 |
| 2010/0277003 A1 | 11/2010 | Von Novak et al. | |
| 2011/0176343 A1* | 7/2011 | Kojima | B60L 11/1811 363/132 |
| 2011/0317452 A1 | 12/2011 | Anguelov et al. | |
| 2012/0091820 A1* | 4/2012 | Campanella | B60L 11/182 307/104 |
| 2012/0091949 A1* | 4/2012 | Campanella | H01F 38/14 320/108 |
| 2012/0091950 A1* | 4/2012 | Campanella | H02J 5/005 320/108 |
| 2012/0112691 A1* | 5/2012 | Kurs | B60L 11/182 320/108 |
| 2012/0299390 A1* | 11/2012 | Kim | B60L 11/182 307/104 |

FOREIGN PATENT DOCUMENTS

| | | |
|---|---|---|
| KR | 10-2008-0064986 A | 7/2008 |
| KR | 10-2008-0068320 A | 7/2008 |
| KR | 10-2010-0098715 A | 9/2010 |

* cited by examiner

APPARATUS AND METHOD FOR CHARGE CONTROL IN WIRELESS CHARGING SYSTEM

CROSS-REFERENCE TO RELATED APPLICATION(S)

This application claims the benefit under 35 USC 119(a) of Korean Patent Application No. 10-2012-0134348 filed on Nov. 26, 2012, in the Korean Intellectual Property Office, and under 35 USC 119(a) of Korean Patent Application No. 10-2013-0141479, filed on Nov. 20, 2013, in the Korean Intellectual Property Office, the entire disclosures of each of which are hereby incorporated by reference for all purposes.

BACKGROUND

1. Field

The following description relates to a wireless charging system and to an apparatus and a method for charge control.

2. Description of Related Art

An explosive increase in the use of electronic devices has spurred research on wireless power transmission technology to alleviate the inconvenience of providing wired power supplies in electronic devices and the limited capacity of batteries. One wireless power transmission technology uses resonance characteristics of radio frequency (RF) devices in order to transmit power wirelessly. For example, a wireless power transmission system using resonance characteristics may include a source configured to supply power, and a target configured to receive supplied power.

SUMMARY

In one general aspect, there is provided an apparatus for charge control in a wireless charging system, the apparatus including an alternating current-to-direct current (AC/DC) converter configured to convert an AC power received wirelessly through a mutual resonance into a DC power, in a receiving mode, an integrated DC-to-DC (DC/DC) converter configured to step down a voltage level of the DC power to a voltage level required by a load in the receiving mode, and to step up an output voltage level of the load to be greater than or equal to a supply voltage level set in a power amplifier in a transmitting mode, and the power amplifier configured to convert the DC voltage stepped up by the integrated DC/DC converter into an AC voltage based on a resonant frequency, and to amplify the converted AC voltage, in the transmitting mode.

The integrated DC/DC converter may include a first capacitor connected in parallel to at least one of the AC/DC converter and the power amplifier, a second capacitor connected in parallel to the load, a first transistor of a P-channel metal oxide semiconductor (PMOS) type, the first transistor connected in series to the first capacitor, a second transistor of an N-channel metal oxide semiconductor (NMOS) type, the second transistor connected in parallel to the first transistor, an inductor connected in series to the second transistor, and an output voltage determining unit configured to determine a voltage applied to the second capacitor to be an output voltage of the integrated DC/DC converter in the receiving mode, and to determine a voltage applied to the first capacitor to be an output voltage of the integrated DC/DC converter in the transmitting mode.

The integrated DC/DC converter may further include a driving voltage determining unit configured to compare a voltage applied to the second capacitor to a voltage applied to the first capacitor and determine a higher voltage to be a driving voltage of the output voltage determining unit.

The apparatus may further include a third switch unit configured to connect the AC/DC converter to the integrated DC/DC converter in the receiving mode to charge the load with a power, and connect the integrated DC/DC converter to the power amplifier in the transmitting mode to transmit the power stored in the load.

The apparatus may further include a controller configured to control an operating time of the first transistor based on a difference between a voltage required by the load and a voltage applied to the second capacitor in the receiving mode.

The controller may be configured to control the operating time of the first transistor based on a difference between a supply voltage set in the power amplifier and a voltage applied to the first capacitor.

The load may include a battery charger configured to charge a battery by storing the DC voltage stepped down by the integrated DC/DC converter, the battery configured to be charged by the battery charger in the receiving mode, and to transfer a DC voltage to the integrated DC/DC converter in the transmitting mode, and a first switch unit configured to connect the battery charger to the battery in the receiving mode, and to break the connection between the battery charger and the battery and connect the integrated DC/DC converter to the battery in the transmitting mode.

The apparatus may further include a resonator configured to receive the AC power through a mutual resonance with a wireless power transmitter in the receiving mode, and to transmit the AC power amplified by the power amplifier through a mutual resonance with a wireless power receiver in the transmitting mode.

The apparatus may further include a second switch unit configured to connect the resonator to the AC/DC converter in the receiving mode, and to break the connection between the resonator and the AC/DC converter and connect the resonator to the power amplifier in the transmitting mode.

In another general aspect, there is provided an apparatus for charge control in a wireless charging system, the apparatus including a rectification unit configured to convert an AC power received wirelessly through a mutual resonance into a DC power, in a receiving mode, a first DC/DC converter configured to step down a voltage level of the DC power to a voltage level required by a load in the receiving mode, a second DC/DC converter configured to step up an output voltage level of the load to be greater than or equal to a supply voltage level set in a power amplifier in a transmitting mode, and the power amplifier configured to convert the DC voltage stepped up by the second DC/DC converter into an AC voltage based on a resonant frequency, and to amplify the converted AC voltage, in the transmitting mode.

The apparatus may further include a resonator configured to receive the AC power through a mutual resonance with a wireless power transmitter in the receiving mode, and to transmit the AC power amplified by the power amplifier through a mutual resonance with a wireless power receiver in the transmitting mode, a first switch unit configured to connect the resonator to the rectification unit in the receiving mode, and to connect the resonator to the power amplifier in the transmitting mode, a second switch unit configured to connect the load to the second DC/DC converter in the transmitting mode, and a controller configured to control operations of the first switch unit and the second switch unit, based on a user input.

The load may include a battery charger configured to charge a battery by storing the DC voltage stepped down by the first DC/DC converter, and the battery configured to be charged by the battery charger in the receiving mode, and to transfer a DC voltage to the second DC/DC converter in the transmitting mode.

In still another general aspect, there is provided a method for charge control in a wireless charging system, the method including converting an AC power received wirelessly through a mutual resonance into a DC power, in a receiving mode, stepping down a voltage level of the DC power to a voltage level required by a load, using an integrated DC/DC converter in the receiving mode, stepping up an output voltage level of the load to be greater than or equal to a supply voltage level set in a power amplifier, using the integrated DC/DC converter in a transmitting mode, and converting the stepped up output voltage level into an AC voltage based on a resonant frequency, and amplifying the converted AC voltage, in the transmitting mode.

The method may further include determining one of the receiving mode and the transmitting mode for an apparatus for charge control in a wireless charging system, based on a user input.

The stepping down may include determining a voltage applied to the load to be an output voltage of the integrated DC/DC converter in the receiving mode.

The stepping up may include determining a voltage applied to the power amplifier to be an output voltage of the integrated DC/DC converter in the transmitting mode.

The method may further include receiving the AC power through a mutual resonance between a resonator and a wireless power transmitter in the receiving mode, and transmitting the AC power amplified by the power amplifier through a mutual resonance between the resonator and a wireless power receiver in the transmitting mode.

In yet another general aspect, there is provided an apparatus for charge control in a wireless charging system, the apparatus including a resonator configured to receive a power through a mutual resonance in a receiving mode, transmit the power through the mutual resonance in a transmitting mode, and transfer an input power to another terminal by reflecting the input power in a relay mode, an integrated DC/DC converter configured to step down a voltage level of a DC signal output from an AC/DC converter to a voltage level required by a load in the receiving mode, and to step up a voltage level output from the load to be greater than or equal to a supply voltage level set in a power amplifier in the transmitting mode, and a controller configured to control the apparatus for charge control in the wireless charging system to operate in one of the receiving mode, the transmitting mode, and the relay mode, and increase an input impedance of the resonator to be greater than or equal to a predetermined value.

The controller may be configured to open the resonator by connecting the resonator to the AC/DC converter in the receiving mode, connecting the resonator to the power amplifier in the transmitting mode, and connecting the resonator to an open port in the relay mode using a switch.

The controller may be configured to open the resonator by controlling the integrated DC/DC converter for a supply voltage of "0" volts to be supplied to the power amplifier in the relay mode.

In further another general aspect, there is provided an apparatus for charge control in a wireless charging system, the apparatus including a resonator configured to receive a power through a mutual resonance in a receiving mode, and reflect an input power in a relay mode, a DC/DC converter configured to step down a voltage level of a DC signal output from an AC/DC converter to a voltage level required by a load in the receiving mode, and a controller configured to control the apparatus for charge control in the wireless charging system to operate in one of the receiving mode, a transmitting mode, and the relay mode, and increase an input impedance of the resonator to be greater than or equal to a predetermined value.

The controller may be configured to open the resonator by connecting the resonator to the AC/DC converter in the receiving mode, and connecting the resonator to an open port in the relay mode using a switch.

The controller may be configured to control the apparatus for charge control in the wireless charging system to operate in the relay mode when charging of the load is completed.

In still another general aspect, there is provided an apparatus for charge control in a wireless charging system, the apparatus including a resonator configured to transmit a power through a mutual resonance in a transmitting mode, and reflect an input power in a relay mode, a DC/DC converter configured to step up a voltage level output from a load to be greater than or equal to a supply voltage level set in a power amplifier in the transmitting mode, and a controller configured to increase an input impedance of the resonator to be greater than or equal to a predetermined value in the relay mode.

The controller may be configured to open the resonator by connecting the resonator to the power amplifier, and connecting the resonator to an open port in the relay mode using a switch.

The controller may be configured to open the resonator by controlling the DC/DC converter for a supply voltage of "0" volts to be supplied to the power amplifier in the relay mode.

The controller may be configured to control the apparatus for charge control in the wireless charging system to operate in the relay mode based on a user input.

In yet another general aspect, there is provided a method for charge control in a wireless charging system, the method including converting an AC power received wirelessly into a DC power, stepping down a voltage level of the DC power to a voltage level required by a load, using an integrated DC/DC converter, and transferring the DC power to the load.

Figure 1:
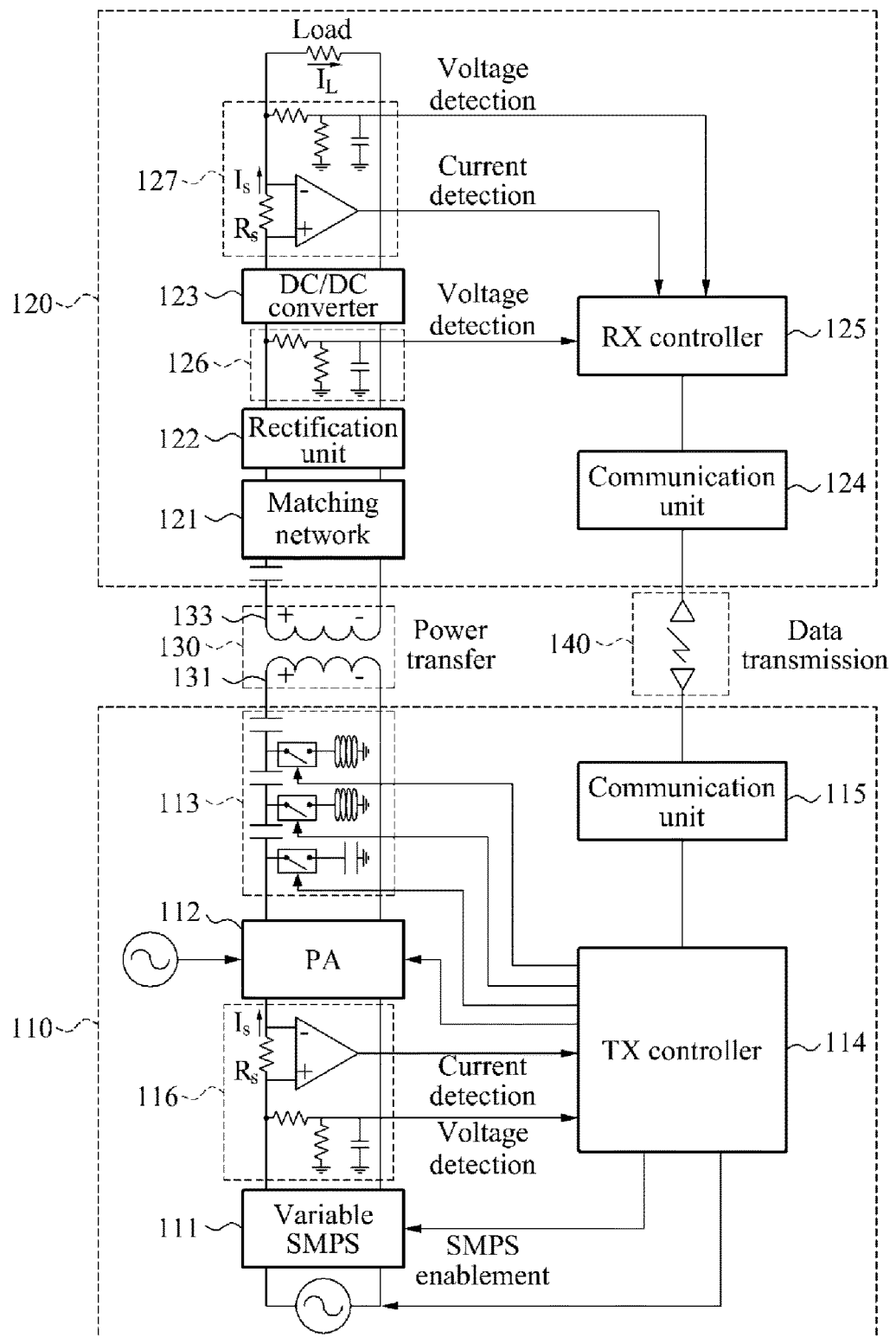
FIG. 1 is a diagram illustrating an example of a wireless charging system.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be implemented by utilizing resonance characteristics of radio frequency (RF) devices. Such a wireless power transmission system may include a source that is configured to supply power, and a target that is configured to receive the power supplied by the source.

A scheme of performing a wireless communication between a source and a target may be an in-band communication scheme, or an out-band communication scheme, or a combination of both. An in-band communication scheme refers to communication performed between a source and a target in the same frequency band as that used for power transmission. An out-band communication scheme refers to communication performed between a source and a target in a frequency band that is different from a frequency band used for the transmission of power between the source and the target. FIG. 1 illustrates an example of a wireless charging system that includes a source and a target.

Referring to FIG. 1, the wireless power transmission system includes a source 110 and a target 120. The source 110 is a device that is configured to supply power wirelessly. The source 110 may be implemented as any electronic device capable of supplying power, such as, for example, a pad, a terminal, a television (TV), a medical device, and an electric vehicle. The target 120 is a device that is configured to receive power wirelessly from the source 110. The target 120 may be implemented in the form of any electronic devices that requires power, such as, for example, a washing machine, a radio, an electric light, a TV, a pad, a terminal, a tablet personal computer (PC), a medical device, and an electric vehicle.

Referring to FIG. 1, the source 110 includes a variable switching mode power supply (SMPS) 111, a power amplifier (PA) 112, a matching network 113, a transmission (TX) controller 114, such as, for example, TX control logic, a communication unit 115, and a power detector 116.

The variable SMPS 111 may generate a direct current (DC) voltage from an alternating current (AC) voltage having a frequency of tens of hertz (Hz) output from a power supply. The variable SMPS 111 may output a DC voltage having a predetermined level, or may output a DC voltage having an adjustable level under the control of the TX controller 114.

The variable SMPS 111 may control a voltage supplied to the PA 112 based on a level of power output from the PA 112 so that the PA 112 may operate in a saturation region with a high efficiency at all times, thereby enabling a maximum efficiency to be maintained at all levels of the output power. In one example, the PA 112 may be a class-E power amplifier, or may exhibit features of a class-E power amplifier.

In an example in which a fixed SMPS outputting a fixed output voltage is used instead of the variable SMPS 111, a variable DC-to-DC (DC/DC) converter may be used to convert the fixed voltage output from the SMPS to a variable voltage supplied to the PA 112. In this example, the common SMPS and the variable DC/DC converter may control a voltage supplied to the PA 112 based on the level of the power output from the PA 112 so that the PA 112 may operate in the saturation region with high efficiency at all times, thereby maintaining the maximum efficiency at all levels of the output power.

The power detector 116 detects an output current and an output voltage of the variable SMPS 111, and provides the TX controller 114 with information regarding the detected current and the detected voltage. Also, the power detector 116 detects an input current and an input voltage of the power amplifier 112.

The power amplifier 112 generates power by converting a DC voltage having a predetermined level to an AC voltage using a switching pulse signal in a band in a range of a few kilohertz (kHz) to tens of MHz. Accordingly, the power amplifier 112 converts a DC voltage supplied to the power amplifier 112 to an AC voltage having a reference resonant frequency $F_{Ref}$, and generates communication power used for communication, or charging power used for charging the target 120, or both. The communication power and the charging power may be send to and used in a plurality of target devices.

The term "communication power" may be a low power suitable for communication purposes, and the communication power may correspond to low power in a range of 0.1 milliwatt (mW) to 1 mW. The term "charging power" may be power suitable for charging a target device, and the charging power may correspond to high power in a range of 1 mW to 200 W that may be consumed by a device load of a target device. In various examples described herein, the term "charging" may refer to supplying power to a unit or element that is configured to charge a battery or other rechargeable device with power for subsequent consumption. The term "charging" may also refer to supplying power to a unit or element that is configured to consume power. The units or elements that may be charged include, for example, batteries, displays, sound output circuits, main processors, various sensors, and the like.

The term "reference resonant frequency" refers to a resonant frequency that is nominally used by the source 110. The term "tracking frequency" refers to a resonant frequency that is actually used by the source 110 and has been adjusted based on a preset scheme.

The TX controller 114 may be configured to detect a reflected wave of the communication power or the charging power, and may be configured to detect a mismatching that occurs between a target resonator 133 and a source resonator 131 based on the detected reflected wave. To detect the mismatching between a source resonator 131 and a target resonator 133, the TX controller 114 may, for example, detect an envelope of the reflected wave, a power amount of the reflected wave, or any other parameter of the reflected wave that is affected by the mismatching.

Under the control of the TX controller 114, the matching network 113 compensates for impedance mismatching between the source resonator 131 and the target resonator 133 in order to achieve optimal matching between the source resonator 131 and the target resonator 133. Referring to FIG. 1, the matching network 113 may include a plurality of switches each connected to a capacitor or an inductor, and the switches may be controlled by the TX controller 114 to achieve optimal matching.

The TX controller 114 calculates a voltage standing wave ratio (VSWR) based on a voltage level of the reflected wave and a level of an output voltage of the source resonator 131 or the power amplifier 112. In the event that the VSWR is greater than a predetermined value, the TX controller 114 may determine that a mismatching has occurred between the source resonator 131 and the target resonator 133.

In the event that the TX controller 114 detects that the VSWR is greater than the predetermined value, the TX controller 114 may compute power transmission efficiency for each of N tracking frequencies, and may determine a tracking frequency $F_{Best}$ providing the best power transmission efficiency among the N tracking frequencies. Based on the result, the TX controller 114 may change the reference resonant frequency $F_{Ref}$ to the tracking frequency $F_{Best}$. In various examples, the N tracking frequencies may be set in advance.

The TX controller 114 may adjust a frequency of the switching pulse signal used by the power amplifier 112. For example, by controlling the frequency of the switching pulse signal used by the power amplifier 112, the TX controller 114 may generate a modulation signal that may be transmitted to the target 120. For example, the TX controller 114 may transmit a variety of data (not illustrated in FIG. 1) to the target 120 using an in-band communication. The TX controller 114 may also detect a reflected wave, and may demodulate a signal received from the target 120 based on an envelope of the detected reflected wave.

The TX controller 114 may generate a modulation signal for in-band communication using various techniques. For example, the TX controller 114 may generate the modulation signal by turning on or off a switching pulse signal, by performing delta-sigma modulation or other modulation technique. The TX controller 114 may also generate a pulse-width modulation (PWM) signal having a predetermined envelope.

The TX controller 114 may determine an initial wireless power that is to be transmitted to the target 120. The TX controller 114 may determine the initial wireless power to be transmitted based on: a change in a temperature of the source 110, a battery state of the target 120, a change in an amount of power received by the target 120, and/or a change in a temperature of the target 120.

The source 110 may further include a temperature measurement sensor (not illustrated) that is configured to detect a change in a temperature of the source 110. The source 110 may receive, from the target 120, information regarding the battery state of the target 120, the change in the amount of power received by the target 120, and/or the change in the temperature of the target 120 by communicating with the target 120.

The TX controller 114 may adjust a voltage supplied to the PA 112 using a lookup table. The lookup table may be used to store an amount of the voltage to be adjusted based on the change in the temperature of the source 110. For example, in response to determining that the temperature of the source 110 has increased, the TX controller 114 may reduce the voltage supplied to the PA 112 based on the lookup table.

The communication unit 115 may perform an out-band communication that employs a communication channel. The communication unit 115 may include a communication module, such as a ZigBee module, a Bluetooth module, or any other communication module known to one of ordinary skill in the art. The communication unit 115 may transmit data 140 to the target 120 through the out-band communication.

The source resonator 131 transfers electromagnetic energy 130 to the target resonator 133. For example, the source resonator 131 transfers the communication power or the charging power to the target 120 via magnetic coupling with the target resonator 133.

As illustrated in FIG. 1, the target 120 includes a matching network 121, a rectification unit 122, a DC/DC converter 123, a communication unit 124, a reception (RX) controller 125, such as, for example, RX control logic, a voltage detector 126, and a power detector 127.

The target resonator 133 receives electromagnetic energy 130 from the source resonator 131. For example, the target resonator 133 receives communication power or charging power from the source 110 via magnetic coupling with the source resonator 131. Additionally, the target resonator 133 may receive data from the source 110 using in-band communication or out-band communication (not illustrated in FIG. 1).

The target resonator 133 may receive the initial wireless power that is determined based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load. The matching network 121 may be configured with a combination of a capacitor and an inductor.

The rectification unit 122 generates a DC voltage by rectifying an AC voltage received from the target resonator 133.

The DC/DC converter 123 adjusts a level of the DC voltage that is output from the rectification unit 122 based on a voltage required by the load. In an example, the DC/DC converter 123 may adjust the level of the DC voltage output from the rectification unit 122 within a range of 3 volts (V) to 10 V.

The voltage detector 126 detects a voltage of an input terminal of the DC/DC converter 123, and the power detector 127 detects a current and an voltage of an output terminal of the DC/DC converter 123. The detected voltage of the input terminal may be used by the controller 125 to compute a transmission efficiency of power received from the source 110. The detected current and the detected voltage of the output terminal may be also used by the RX controller 125 to compute an amount of power transferred to the load. The TX controller 114 of the source 110 may determine an amount of power that needs to be transmitted by the source 110 based on a power required by the load and the power transferred to the load.

When the amount of power transferred to the load computed by the communication unit 124 is transmitted to the source 110, the source 110 may compute an amount of power that needs to be transmitted to the target 120.

The communication unit 124 performs an in-band communication to transmit or receive data using a resonant frequency. During the in-band communication, the RX controller 125 demodulates a received signal by detecting a signal between the target resonator 133 and the rectification unit 122, or detecting an output signal of the rectification unit 122.

The RX controller 125 may also adjust an impedance of the target resonator 133 using the matching network 121 to modulate a signal to be transmitted to the source 110. For example, the RX controller 125 may increase the impedance of the target resonator 133 so that a reflected wave may be detected by the TX controller 114 of the source 110. Depending on whether the reflected wave is detected, the TX controller 114 may detect a first value, for example, a binary number "0," or a second value, for example, a binary number "1." For example, when the reflected wave is detected, the TX controller may detect "0", and when the reflected wave is not detected, the TX controller may detect "1". Alternatively, when the reflected wave is detected, the TX controller may detect "1", and when the reflected wave is not detected, the TX controller may detect "0".

The communication unit 124 of the target 120 may transmit a response message to the communication unit 115 of the source 110. For example, the response message may include one or more of: a type of a corresponding target, information about a manufacturer of the corresponding target, a model name of the corresponding target, a battery type of the corresponding target, a charging scheme of the corresponding target, an impedance value of a load of the corresponding target, information on characteristics of a target resonator of the corresponding target, information on a frequency band used by the corresponding target, an amount of power consumed by the corresponding target, an identifier (ID) of the corresponding target, information on a version or a standard of the corresponding target, and any other information regarding the corresponding target.

The communication unit 124 may perform an out-band communication using a separate communication channel. For example, the communication unit 124 may include a communication module, such as a ZigBee module, a Bluetooth module, or any other communication module known to one of ordinary skill in the art. The communication unit 124 may transmit or receive data 140 to or from the source 110 using the out-band communication.

The communication unit 124 may receive a wake-up request message from the source 110, and the power detector 127 may detect an amount of power received by the target resonator 133. The communication unit 124 may transmit, to the source 110, information on the detected amount of the power. The information on the detected amount of the power may include, for example, an input voltage value and an input current value of the rectification unit 122, an output voltage value and an output current value of the rectification unit 122, an output voltage value and an output current value of the DC/DC converter 123, and any other information about the detected amount of the power.

Figure 2:
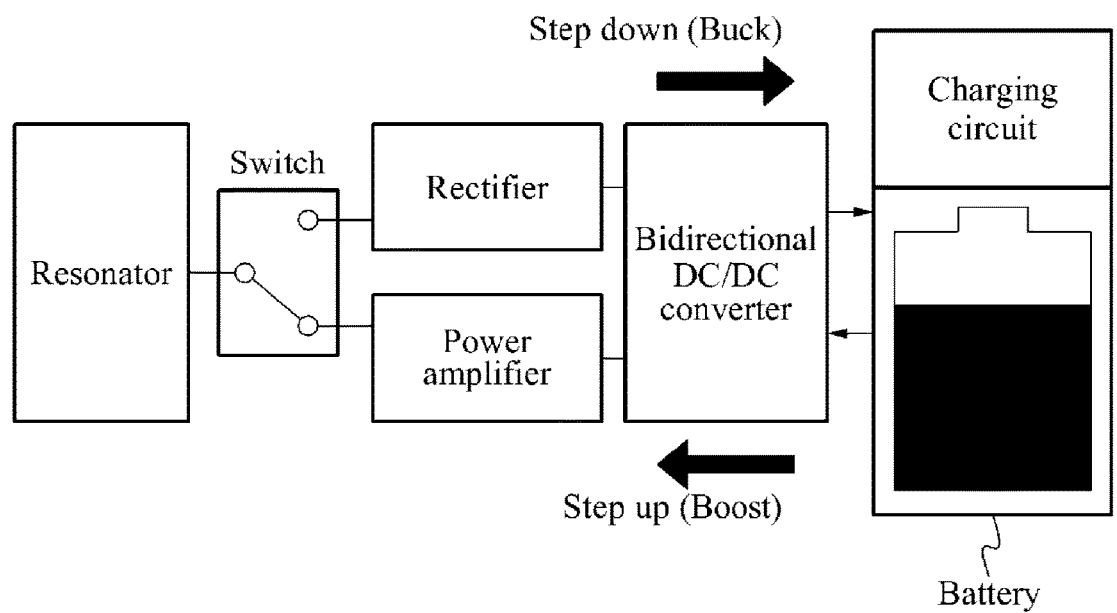
FIG. 2 is a diagram illustrating an example of an apparatus for charge control.

FIG. 2 illustrates an example of an apparatus for charge control that may be used in a wireless charging system. Hereinafter, the apparatus for charge control that may be used in the wireless charging system will be referred to as the charge control apparatus.

Referring to FIG. 2, the charge control apparatus includes a resonator, a switch, a rectifier, a power amplifier, a bidirectional DC/DC converter, a charging circuit, and a battery.

In this example, the charge control apparatus may operate in a transmitting mode or in a receiving mode. However, the charge control apparatus is not limited thereto. For instance, in another example, a charge control apparatus may operate only in a transmitting mode, or only in a receiving mode.

Referring back to FIG. 2 in the receiving mode, the charge control apparatus may receive power. In the transmitting mode, the charge control apparatus may transmit power.

In addition, the charge control apparatus may operate in a relay mode. In the relay mode, the charge control apparatus may relay or transmit an input power to transfer the power to another terminal. For example, a completely charged terminal may operate in the relay mode to transfer an input power to another terminal.

In the receiving mode, the switch may connect the resonator to the rectifier. The resonator may receive power wirelessly from an external power supply apparatus through a mutual resonance. The rectifier may rectify an AC power received from the resonator to a DC power. The bidirectional DC/DC converter may adjust a voltage level of the DC power of the rectifier into a charging voltage level of the battery. In this example, the voltage level of the DC power is greater than the charging voltage level of the battery. Thus, the bidirectional DC/DC converter may perform a step-down operation to decrease the voltage level. The bidirectional DC/DC converter may operate as a buck converter.

In the transmitting mode, the switch may connect the resonator to the power amplifier. A voltage level of power charged in the battery may be amplified to a supply voltage level of the power amplifier through the bidirectional DC/DC converter. As the supply voltage level of the power amplifier, a voltage greater than or equal to a threshold value may be required for power transmission via the resonator. The supply voltage of the power amplifier may refer to a driving voltage to be used to drive the power amplifier. For example, 5 V may be applied as the threshold value.

However, the threshold value is not limited thereto, and may vary based on application. In this example, the supply voltage level is greater than the voltage level of the power charged in the battery. Thus, the bidirectional DC/DC converter may perform a step-up operation for increasing the voltage level. The bidirectional DC/DC converter may operate as a boost converter.

In an example, the bidirectional DC/DC converter may have a configuration of an integrated DC/DC converter 340 illustrated in FIG. 3. In another example, the bidirectional DC/DC converter may include a first DC/DC converter 440 and a second DC/DC converter 470, as illustrated in FIG. 4.

The charging circuit may refer to a circuit that may be mounted in a charger, or to an electric circuit to be used for charging the battery. The charging circuit may be used in a process of charging the battery in the receiving mode.

Figure 3A:
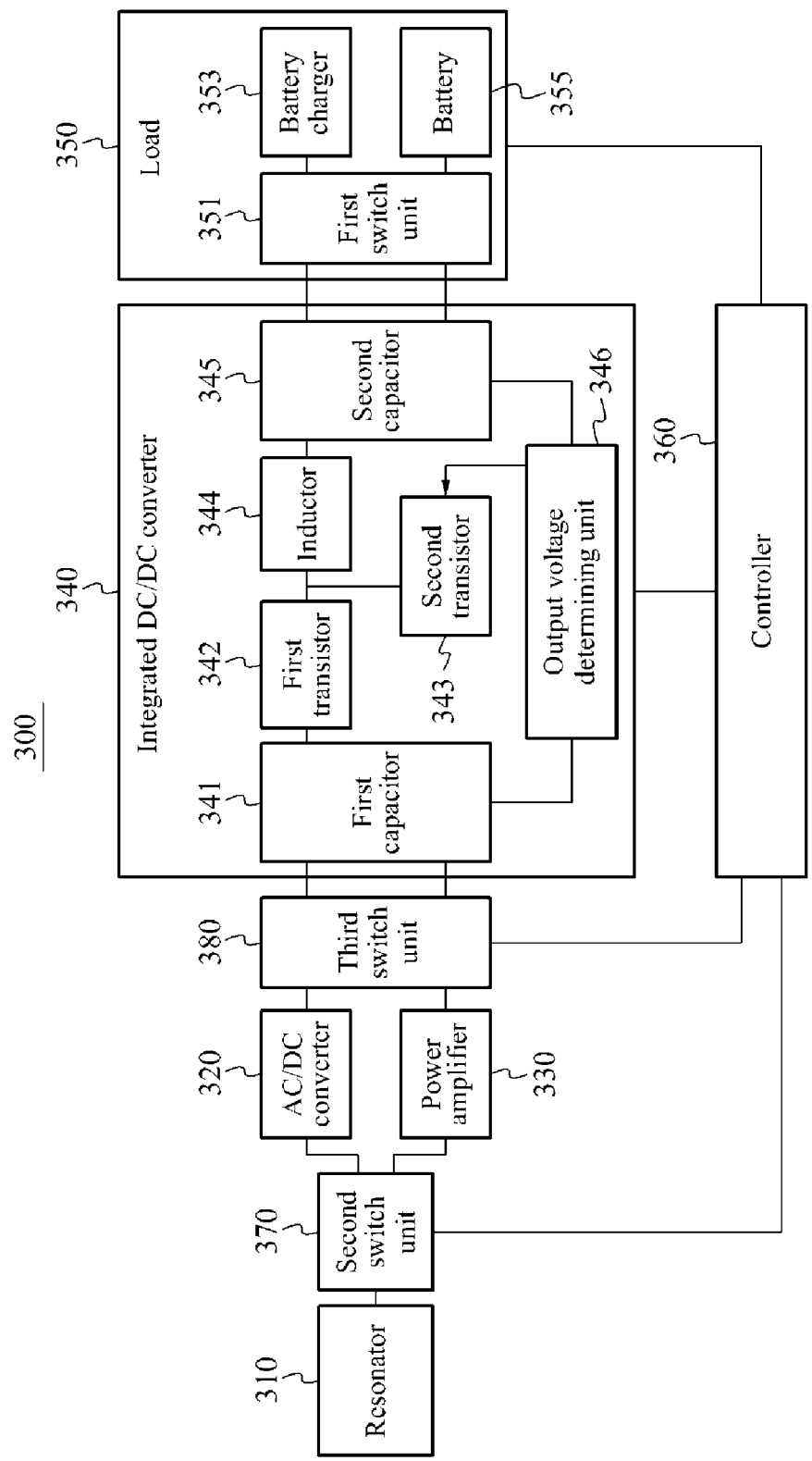
FIGS. 3A and 3B are blocks diagram illustrating an example of an apparatus for charge control.
Figure 3B:
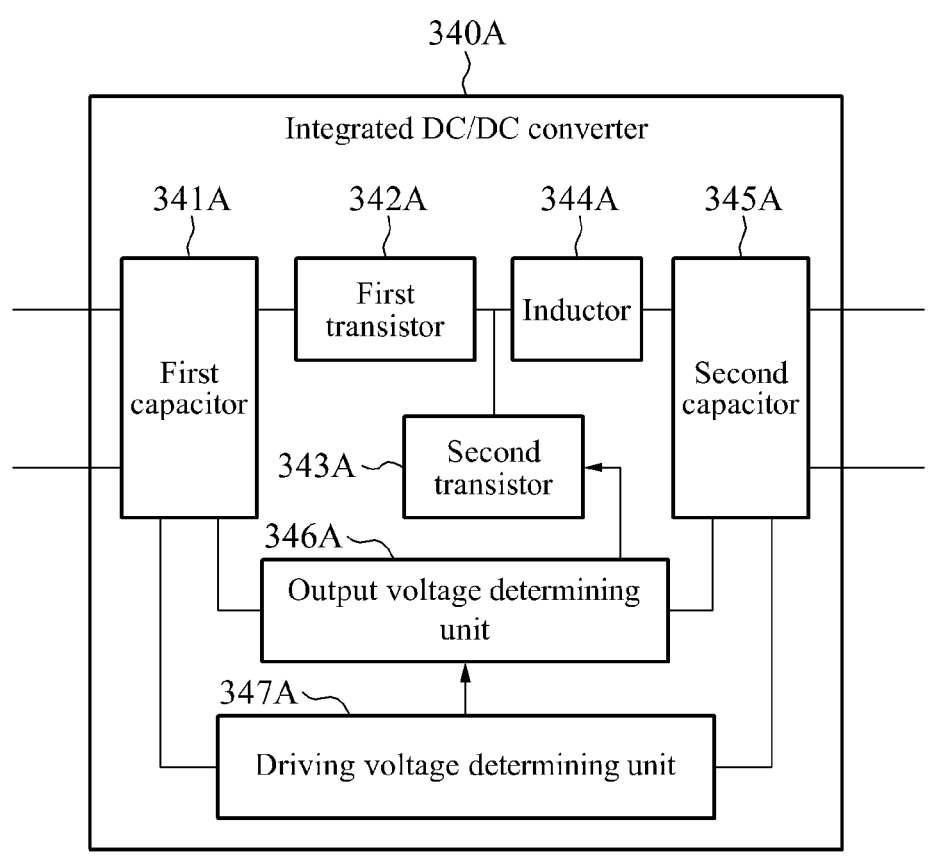
Figure 4:
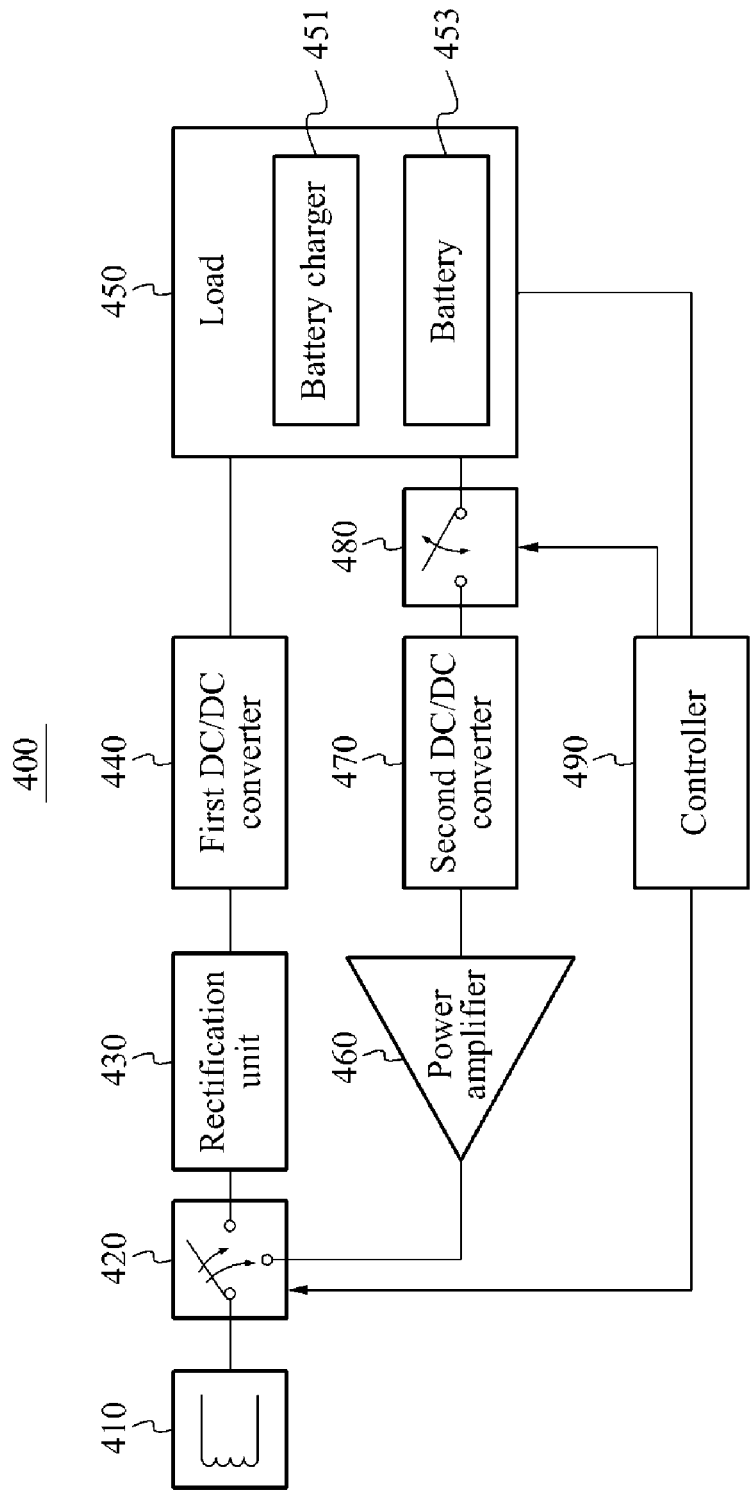
FIG. 4 is a block diagram illustrating another example of an apparatus for charge control.

FIGS. 3A and 3B are blocks diagram illustrating an example of an apparatus for charge control.

Referring to FIG. 3A, the charge control apparatus 300 includes a resonator 310, an AC/DC converter 320, a power amplifier 330, an integrated DC/DC converter 340, and a controller 360. A load 350 may be included as a part of the charge control apparatus 300, or may correspond to an external apparatus separate from the charge control apparatus 300.

The charge control apparatus 300 may operate in a transmitting mode or a receiving mode. In the receiving mode, the charge control apparatus 300 may receive power. In the transmitting mode, the charge control apparatus 300 may transmit power.

The resonator 310 may receive an AC power through a mutual resonance with a wireless power transmitter (not shown), in the receiving mode. The resonator 310 may transmit an AC power amplified by the power amplifier 330 through a mutual resonance with a wireless power receiver (not shown), in the transmitting mode. The resonator 310 may be used as a resonator configured to receive power, in the receiving mode, and may be used as a resonator configured to transmit power, in the transmitting mode.

The AC/DC converter 320 may convert an AC power received wirelessly through a mutual resonance into a DC power, in the receiving mode. For example, the AC/DC converter 320 may operate as a rectifier.

The integrated DC/DC converter 340 may step down a voltage level of the DC power converted by the AC/DC converter 320 to a voltage level required by the load 350 in the receiving mode, and may step up an output voltage level of the load 350 to be greater than or equal to a supply voltage level set in the power amplifier 330 in the transmitting mode. For example, when the load 350 corresponds to a portable phone, the voltage level required by the load 350 may be in a range of 3.3 V to 3.8 V. The required voltage level may have various values depending on a type of the load 350. In addition, 5 V may be set to be the supply voltage level.

The integrated DC/DC converter 340 may operate as a buck converter configured to step down a voltage in the receiving mode, and may operate as a boost converter configured to step up a voltage in the transmitting mode.

A third switch unit 380 may connect the AC/DC converter 320 to the integrated DC/DC converter 340 in the receiving mode. The third switch unit 380 may connect the power amplifier 330 to the integrated DC/DC converter 340 in the transmitting mode. The third switch unit 380 may connect the integrated DC/DC converter 340 to one of the AC/DC converter 320 and the power amplifier 330.

The power amplifier 330 may convert the DC voltage stepped up by the integrated DC/DC converter 340 into an AC voltage based on a resonant frequency, and may amplify the converted AC voltage, in the transmitting mode. The power amplifier 330 may adjust a degree of the amplification based on an amount of power to be transmitted through the resonator 310. The power amplifier 330 may perform an operation of a DC/AC converter that is configured to convert a DC voltage into an AC voltage using a resonant frequency of the resonator 310.

Referring to FIG. 3A, the integrated DC/DC converter 340 may have the following configuration in order to perform a step-up operation and a step-down operation.

The integrated DC/DC converter 340 includes a first capacitor 341, a first transistor 342, a second transistor 343, an inductor 344, a second capacitor 345, and an output voltage determining unit 346.

The first capacitor 341 may be connected in parallel to at least one of the AC/DC converter 320 and the power amplifier 330.

The first transistor 342 may be connected in series to the first capacitor 341, and may be of a P-channel metal oxide semiconductor (PMOS) type.

The second transistor 343 may be connected in parallel to the first transistor 342, and may be of an N-channel metal oxide semiconductor (NMOS) type.

The inductor 344 may be connected in series to the second transistor 343.

The second capacitor 345 may be connected in parallel to the load 350. The second capacitor 345 may be connected in parallel to the inductor 344.

Depending on an operation of the output voltage determining unit 346, the integrated DC/DC converter 340 may operate as a buck converter, or may operate as a boost converter.

The output voltage determining unit 346 may determine a voltage applied to the second capacitor 345 to be an output voltage of the integrated DC/DC converter 340, in the receiving mode. The output voltage determining unit 346 may determine a voltage applied to the first capacitor 341 to be the output voltage of the integrated DC/DC converter 340, in the transmitting mode.

The output voltage determined by the output voltage determining unit 346 may be input into the second transistor 343. The output voltage determined by the output voltage determining unit 346 may be input into the second transistor 343 such that a feedback circuit may be formed. In the receiving mode, the voltage applied to the second capacitor 345 may be input into the second transistor 343 such that a feedback circuit may be formed. In the transmitting mode, the voltage applied to the first capacitor 341 may be input into the second transistor 343 such that a feedback circuit may be formed.

Referring to FIG. 3A, the load 350 includes a first switch unit 351, a battery charger 353, and a battery 355.

The battery charger 353 may charge the battery 355 by storing the DC voltage stepped down by the integrated DC/DC converter 340.

The battery 355 may be charged by the battery charger 353, in the receiving mode. For example, using the DC voltage stepped down by the integrated DC/DC converter 340, the battery 355 may be charged directly in the receiving mode. Conversely, the battery 355 may transfer the DC voltage to the integrated DC/DC converter 340, in the transmitting mode. For example, the power stored in the battery 355 may be transmitted wirelessly through the integrated DC/DC converter 340, the power amplifier 330, and the resonator 310.

The first switch unit 351 may connect the battery charger 353 to the battery 355, in the receiving mode. The first switch unit 351 may break the connection between the battery charger 353 and the battery 355, and may connect the integrated DC/DC converter 340 to the battery 355, in the transmitting mode.

For example, the controller 360 may determine a mode of the charge control apparatus 300 as either the receiving mode or the transmitting mode based on a user input. The controller 360 may control the first switch unit 351, the second switch unit 370, and the third switch unit 380.

In another example, the controller 360 may determine a mode of the charge control apparatus 300 as either the receiving mode or the transmitting mode based on an amount of power stored in the load 350. When the amount of power stored in the load 350 is less than or equal to a reference set by a user, the controller 360 may control the charge control apparatus 300 to operate in the receiving mode. When a request for power transmission is received from another terminal and the amount of power stored in the load 350 is greater than or equal to a minimum transmittable reference, the controller may control the charge control apparatus 300 to operate in the transmitting mode.

The controller 360 may control the third switch unit 380 to adjust the connection between the AC/DC converter 320 and the integrated DC/DC converter 340, and the connection between the integrated DC/DC converter 340 and the power amplifier 330.

The controller 360 may control an operating time of the first transistor 342 based on a difference between a voltage applied to the second capacitor 345 and a voltage required by the load 350, in the receiving mode. When the voltage applied to the second capacitor is less than the voltage required by the load 350, the controller 360 may increase an operating time, for example a turn-on time, of the first transistor 342. Conversely, when the voltage applied to the second capacitor 345 is greater than the voltage required by the load 350, the controller 360 may reduce the operating time, for example, the turn-on time, of the first transistor 342.

The controller 360 may control the operating time of the first transistor 345 based on a difference between a voltage applied to the first capacitor 341 and a supply voltage set in the power amplifier 330, in the transmitting mode. When the voltage applied to the first capacitor 341 is less than the supply voltage set in the power amplifier 330, the controller 360 may increase the operating time, for example, the turn-on time, of the first transistor 342. Conversely, when the voltage applied to the first capacitor 341 is greater than the supply voltage set in the power amplifier 330, the controller 360 may reduce the operating time, for example, the turn-on time, of the first transistor 342.

A second switch unit 370 may connect the resonator 310 to the AC/DC converter 320, in the receiving mode. The second switch unit 370 may break the connection between the resonator 310 and the AC/DC converter 320, and may connect the resonator 310 to the power amplifier 330, in the transmitting mode.

The controller 360 may determine a mode to be one of the receiving mode and the transmitting mode, based on the amount of the power stored in the load 350, and may control operations of the first switch unit 351, the second switch unit 370, and the third switch unit 380, based on the determined mode.

The controller 360 may determine a mode to be one of the receiving mode and the transmitting mode, based on a user selection, and may control operations of the first switch unit 351, the second switch unit 370, and the third switch unit 380, based on the determined mode.

Referring to FIG. 3B, a driving voltage determining unit 347A may determine a driving voltage to operate an output voltage determining unit 346A. The driving voltage determining unit 347A may compare a voltage applied to a second capacitor 345A to a voltage applied to a first capacitor 341A, and determine a higher voltage to be the driving voltage of the output voltage determining unit 346A.

Since the voltage applied to the first capacitor 341A may be greater than the voltage applied to the second capacitor 345A in the receiving mode, the voltage applied to the first capacitor 341A may be determined to be the driving voltage of the output voltage determining unit 346A.

In the transmitting mode, it may take a time for the voltage applied to the first capacitor 341A to reach the supply voltage set in the power amplifier 330. Since there may be a transient state, the voltage applied to the second capacitor 345A may be greater than the voltage applied to the first capacitor 341A at the beginning of the transmitting mode. Thus, in the beginning of the transmitting mode, the voltage applied to the second capacitor 345A may be determined to be the driving voltage of the output voltage determining unit 346A. Over time, the voltage applied to the first capacitor 341A may be determined to be the driving voltage of the output voltage determining unit 346A.

The controller 360 may perform an overall control of the charge control apparatus 300, and may perform functions of the AC/DC converter 320, the power amplifier 330, and the integrated DC/DC converter 340. The AC/DC converter 320, the power amplifier 330, and the integrated DC/DC converter 340 are separately illustrated in FIG. 3 in order to describe each function separately. Thus, in response to a product being implemented, the controller 360 may perform all of the functions, or may perform a portion of the functions.

FIG. 4 illustrates another example of an apparatus 400 for charge control that may be used in a wireless charging system.

Referring to FIG. 4, the charge control apparatus 400 includes a resonator 410, a first switch unit 420, a rectification unit 430, a first DC/DC converter 440, a power amplifier 460, a second DC/DC converter 470, a second switch unit 480, and a controller 490. A load 450 may be included as a part of the charge control apparatus 400, or may correspond to an external apparatus separating from the charge control apparatus 400.

The charge control apparatus 400 may operate in a transmitting mode or in a receiving mode. In the receiving mode, the charge control apparatus 400 may receive power. In the transmitting mode, the charge control apparatus 400 may transmit power.

The resonator 410 may receive an AC power through a mutual resonance with a wireless power transmitter (not shown), in the receiving mode. The resonator 410 may transmit an AC power amplified by the power amplifier 460 through a mutual resonance with a wireless power receiver (not shown), in the transmitting mode.

In the transmitting mode, the first switch unit 420 may connect the resonator 410 to the rectification unit 430 in the receiving mode, and may connect the resonator 410 to the power amplifier 460.

In the receiving mode, the rectification unit 430 may rectify an AC power received wirelessly through a mutual resonance into a DC power.

Further, in the receiving mode, the first DC/DC converter 440 may step down a voltage level of the DC power rectified by the rectifying unit 430 to a voltage level required by the load 450.

The second DC/DC converter 470 may step up an output voltage level of the load 450 to be greater than or equal to a supply voltage level set in the power amplifier 460, in the transmitting mode.

The first DC/DC converter 440 may operate as a buck converter configured to step down a voltage in the receiving mode, and the second DC/DC converter 470 may operate as a boost converter configured to step up a voltage in the transmitting mode. The first DC/DC converter 440 and the second DC/DC converter 470 may be mounted on a single module.

The power amplifier 460 may convert the DC voltage stepped up by the second DC/DC converter 470 into an AC voltage based on a resonant frequency, and may amplify the converted AC voltage, in the transmitting mode. The power amplifier 460 may adjust a degree of the amplification based on an amount of power to be transmitted through the resonator 410.

The second switch unit 480 may connect the load 450 to the second DC/DC converter 470, in the transmitting mode. The second switch unit 480 may break the connection between the load 450 and the second DC/DC converter 470, in the receiving mode.

The controller 490 may control operations of the first switch unit 420 and the second switch unit 480, based on the amount of the power stored in the load 450.

The load 450 includes a battery charger 451, and a battery 453.

The battery charger 451 may charge the battery 453 by storing the DC voltage stepped down by the first DC/DC converter 440. The battery 453 may be charged by the battery charger 451 in the receiving mode, and may transfer the DC voltage to the second DC/DC converter 470 in the transmitting mode.

The controller 490 may perform an overall control of the charge control apparatus 400, and may perform functions of the first switch unit 420, the rectification unit 430, the first DC/DC converter 440, the power amplifier 460, the second DC/DC converter 470, and the second switch unit 480. The first switch unit 420, the rectification unit 430, the first DC/DC converter 440, the power amplifier 460, the second DC/DC converter 470, and the second switch unit 480 are separately illustrated in FIG. 4 in order to describe each function separately. However, a product may be implemented such that a controller 490 with or without separate units may perform all of the functions, or may perform a portion of the functions.

Figure 5:
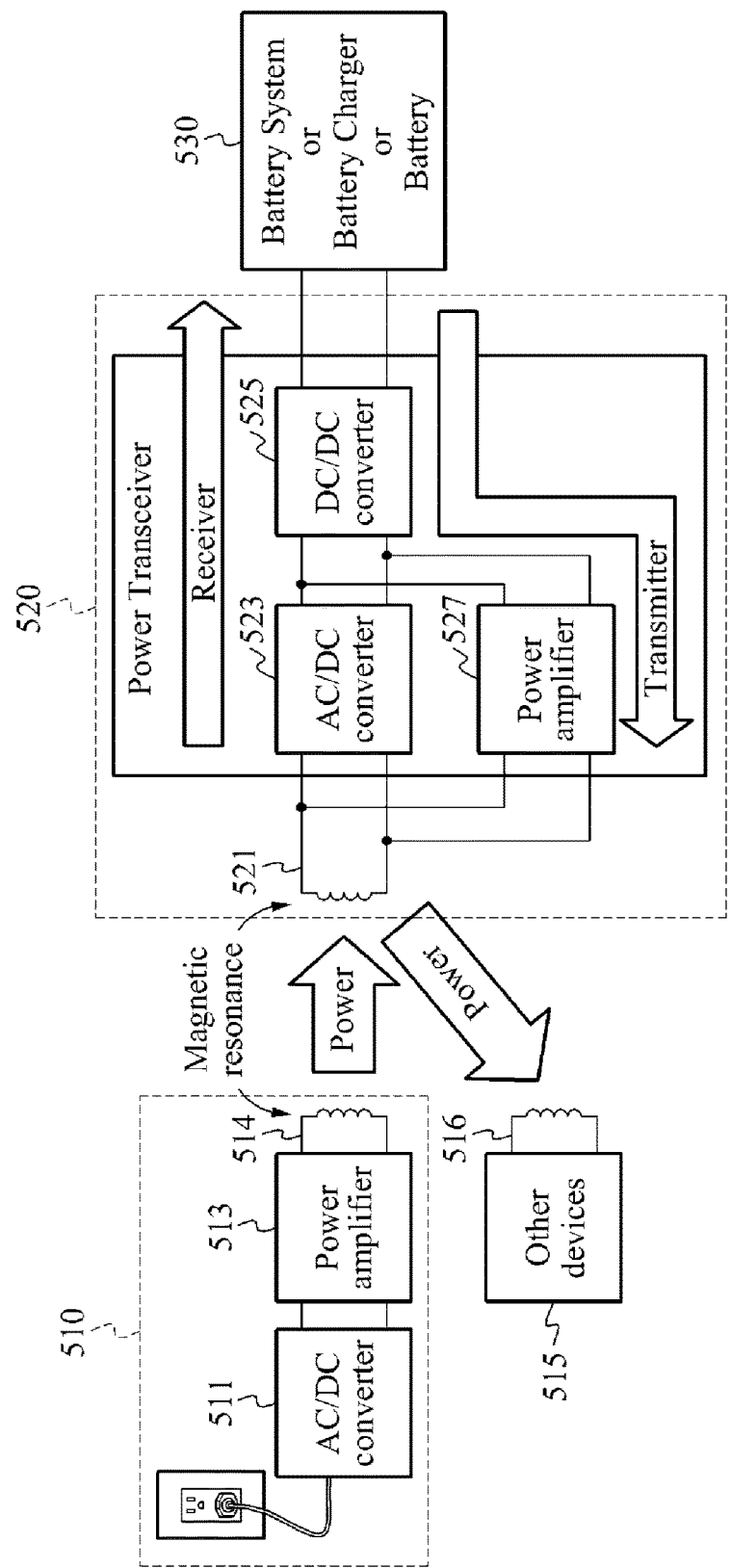
FIG. 5 is a block diagram illustrating an example of a wireless charging system.

FIG. 5 illustrates an example of a wireless charging system.

Referring to FIG. 5, the wireless charging system includes a wireless power transmitter 510, a wireless power receiver 515, and an apparatus 520 for charge control in the wireless charging system. The wireless power receiver 515 may include other devices not illustrated in FIG. 5.

The wireless power transmitter 510 includes an AC/DC converter 511, a power amplifier 513, and a resonator 514. The AC/DC converter 511 may convert an AC power received in a wired or wireless manner into a DC power. The power amplifier 513 may convert the DC power converted by the AC/DC converter 511 into an AC power using a resonant frequency of the resonator 514, and may amplify the AC power based on an amount of power to be transferred. A mutual resonance may refer to a magnetic resonance between the resonator 514 and a resonator 521.

The charge control apparatus 520 includes the resonator 521, an AC/DC converter 523, a DC/DC converter 525, and a power amplifier 527. The charge control apparatus 520 may transfer power to a load 530, and may transfer power supplied by the load 530 to the wireless power receiver 515.

The charge control apparatus 520 may operate as a wireless power receiver or a wireless power transmitter.

When the charge control apparatus 520 operates as the wireless power receiver, the AC/DC converter 523 may convert an AC power received from the resonator 521 into a DC power. The DC/DC converter 525 may convert a voltage level of the DC power to a voltage level required by the load 530. In this example, the voltage level of the DC power converted from the AC power is greater than the voltage level required by the load 530. Thus, the DC/DC converter 525 may perform a step-down operation. For example, a voltage required by the load 530 may refer to a rated voltage. The rated voltage may be changed based on a type and capacity of the load 530. For example, a rated voltage of a portable phone may be in a rage of 3.3 V to 3.8 V. The voltage converted to the voltage level required by the load 530 may be transferred to the load 530. The load 530 may refer to a battery system, a battery charger, or a battery.

When the charge control apparatus 520 operates as the wireless power transmitter, the DC/DC converter 525 may convert a voltage level of the DC power supplied by the load 530 to a supply voltage level of the power amplifier 527. In this example, the voltage level of the DC power supplied by the load 530 is less than the supply voltage level of the power amplifier 527. Thus, the DC/DC converter 525 may perform a step-up operation. The power amplifier 527 may convert the voltage supplied by the DC/DC converter 525 into an AC voltage using a resonant frequency of the resonator 521, and may amplify the power based on an amount of power to be transferred.

The resonator 521 may transfer the amplified power, through a mutual resonance between the wireless power receiver 515 and the resonator 516.

Figure 6:
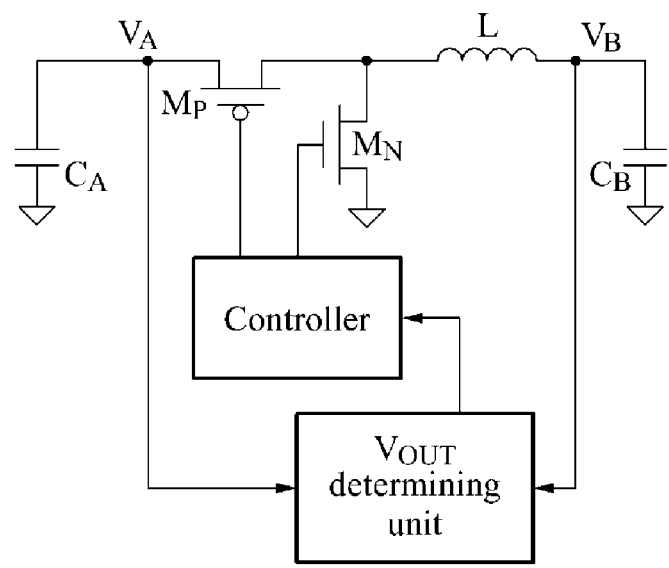
FIGS. 6 through 8 are diagrams illustrating examples of an integrated direct current-to-direct current (DC/DC) converter of an apparatus for charge control.
Figure 7:
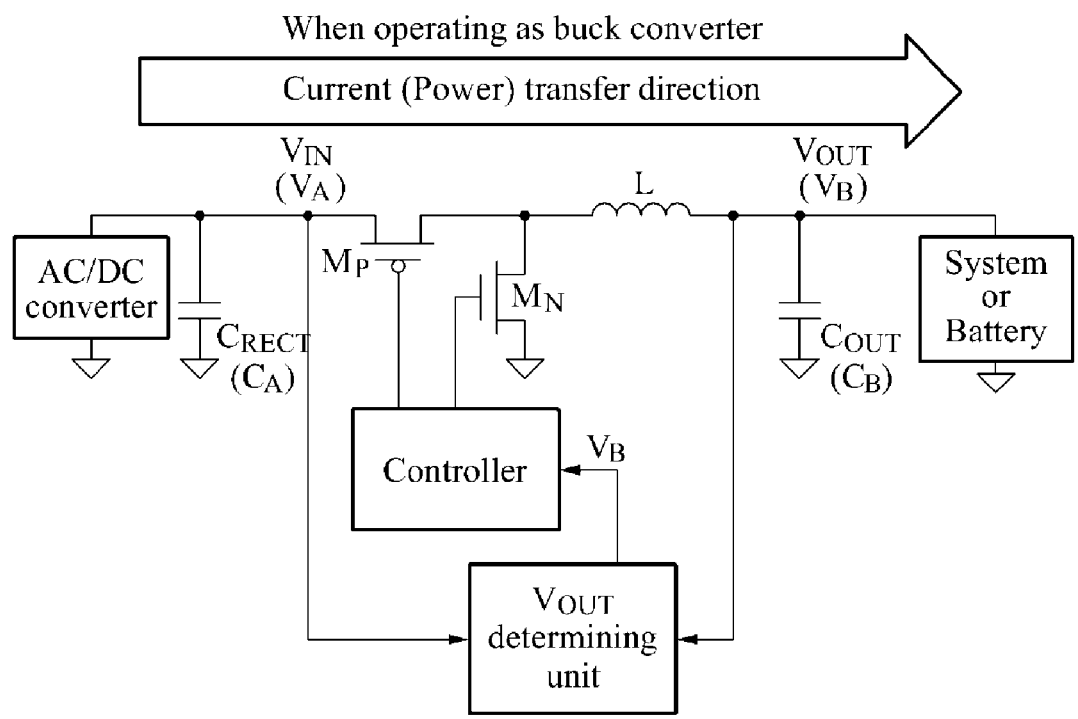
Figure 8:
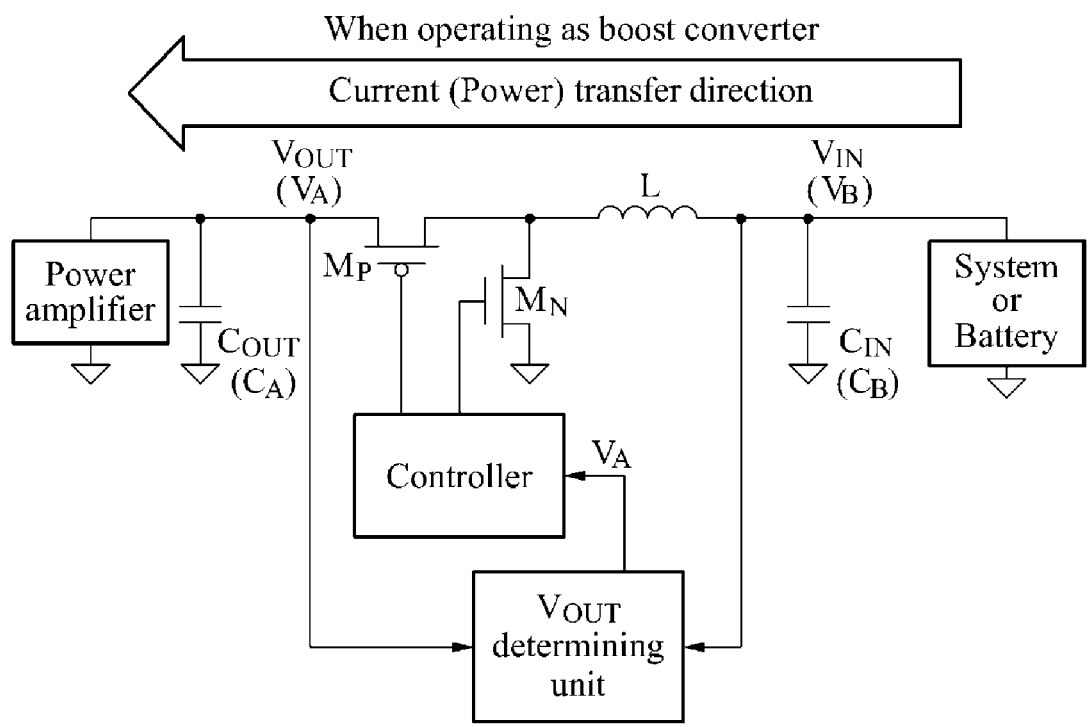

FIGS. 6 through 8 illustrate various examples of integrated DC/DC converter which may be used in an apparatus for charge control in a wireless charging system.

The integrated DC/DC converter 340 of FIG. 3 may have a structure of the converter illustrated in FIG. 6. The integrated DC/DC converter 340 may operate in both directions, and may perform both an operation of a buck converter and an operation of a boost converter.

Referring to FIG. 6, a single capacitor may be connected to an input of the integrated DC/DC converter 340, and another single capacitor may be connected to an output of the integrated DC/DC converter 340. An inductor may be connected to the input and output of the integrated DC/DC converter 340. A $V_{OUT}$ determining unit configured to select an output voltage may be provided. When the integrated DC/DC converter 340 operates as the buck converter, a capacitor $C_A$ may operate as an output capacitor of an AC/DC converter, and a capacitor $C_B$ may operate as an output capacitor of the integrated DC/DC converter 340. When the integrated DC/DC converter 340 operates as the boost converter, the capacitor $C_A$ may operate as an output capacitor of the integrated DC/DC converter 340, and the capacitor $C_B$ may operate as an input capacitor of the integrated DC/DC converter 340. When a single power transistor $M_P$ and a single power transistor $M_N$ are used, and a single external inductor is used, a size of the entire system may be reduced greatly.

Referring to FIG. 7, when the integrated DC/DC converter 340 operates as the wireless power receiver, the integrated DC/DC converter 340 may perform a role of a buck converter.

The buck converter may be configured to generate a stable output voltage, irrespective of a change in an input voltage. Accordingly, a voltage of $V_B$ may be selected by a $V_{OUT}$ determining unit, and a stable output voltage may be generated by an operation of a controller. The controller may control a feedback flow, and may perform an operation of a driving buffer.

The integrated DC/DC converter 340 may generate a voltage $V_{IND}$ having a voltage $V_{IN}$ and a ground voltage of 0 V, regularly, by a switching operation of a PMOS transistor $M_P$ and an NMOS transistor $M_N$. The integrated DC/DC converter 340 may generate a voltage $V_{OUT}$ by performing LC-filtering with respect to the voltage $V_{IND}$ by an inductor and a capacitor. The voltage $V_{OUT}$ may have an average value of the voltage $V_{IND}$. Since the voltage $V_{OUT}$ may have the average value of the voltage $V_{IND}$ having the voltage $V_{IN}$ and the voltage of 0 V regularly, the voltage $V_{OUT}$ may be lower than the voltage $V_{IN}$ at all times.

When the voltage $V_B$ is less than a voltage predetermined by a user, the controller may increase a time for which the voltage $V_{IND}$ has the voltage $V_{IN}$, by increasing a time during which the PMOS transistor $M_P$ is turned on, thereby controlling a feedback loop so that the LC-filtered voltage $V_{OUT}$ may increase. The controller may include a driving buffer configured to drive the power transistors $M_P$ and $M_N$.

Referring to FIG. 8, when the integrated DC/DC converter 340 operates as the wireless power transmitter, the integrated DC/DC converter 340 may perform a role of a boost converter.

When the integrated DC/DC converter 340 operates as the boost converter, an output voltage may correspond to the voltage of a $V_A$ node, a $V_{OUT}$ determining unit may select $V_A$, and may input the $V_A$ into a controller.

The integrated DC/DC converter 340 may turn on an NMOS transistor $M_N$ to store energy in an inductor, and may turn on a PMOS transistor $M_P$ to transfer energy of the inductor and $V_{IN}$ to $V_{OUT}$. In this example, the $V_{OUT}$ may have a voltage greater than a voltage of the $V_{IN}$ at all times. When $V_A$ is less than a voltage predetermined by a user, the controller may increase a time during which the PMOS transistor $M_P$ is turned ON, thereby increasing a time during which both the $V_{IN}$ and the energy of the inductor are transferred to the $V_{OUT}$.

Figure 9:
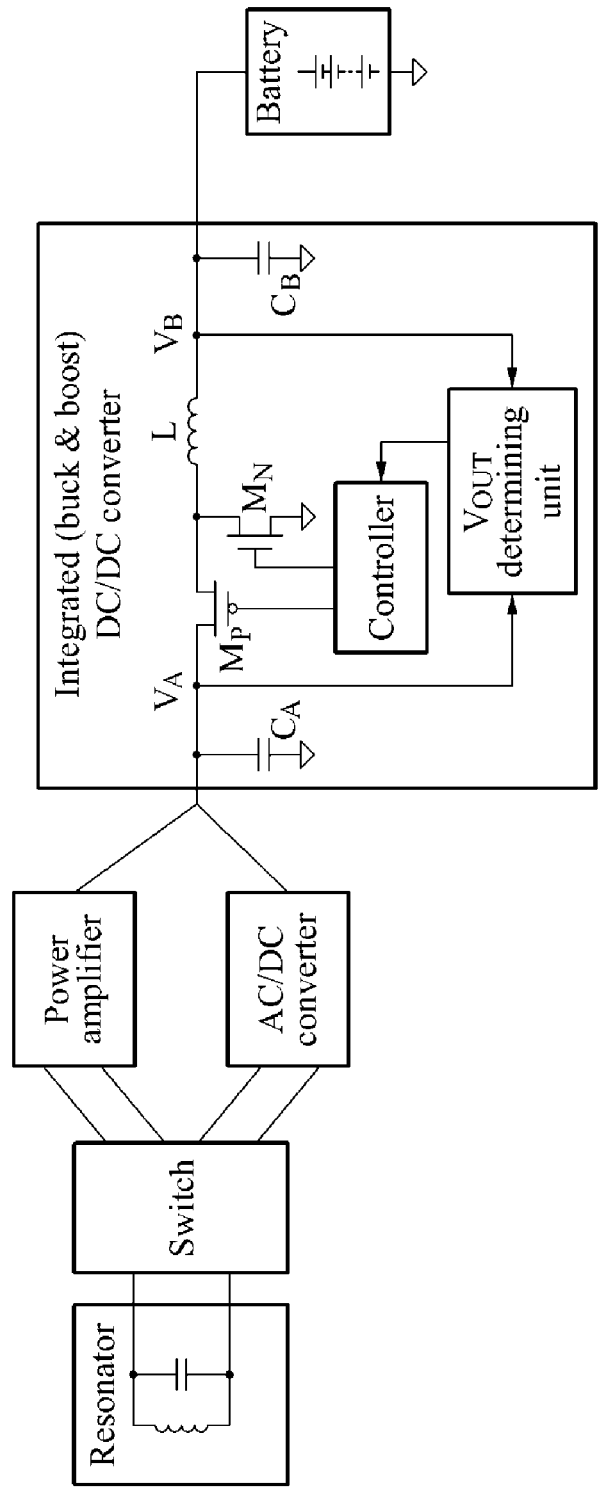
FIG. 9 is a block diagram illustrating still another example of an apparatus for charge control.

FIG. 9 illustrates still another example of an apparatus for charge control that may be used in a wireless charging system.

Referring to FIG. 9, in a receiving mode, a resonator may be connected to an AC/DC converter by a switch. In a transmitting mode, the resonator may be connected to a power amplifier by the switch.

The AC/DC converter may be configured to convert an AC voltage received from the resonator into a stable DC voltage and supply the DC voltage to an input of an integrated DC/DC converter. The power amplifier may be configured to amplify an output power of the integrated DC/DC converter to a power required for a mutual resonance.

Figure 10:
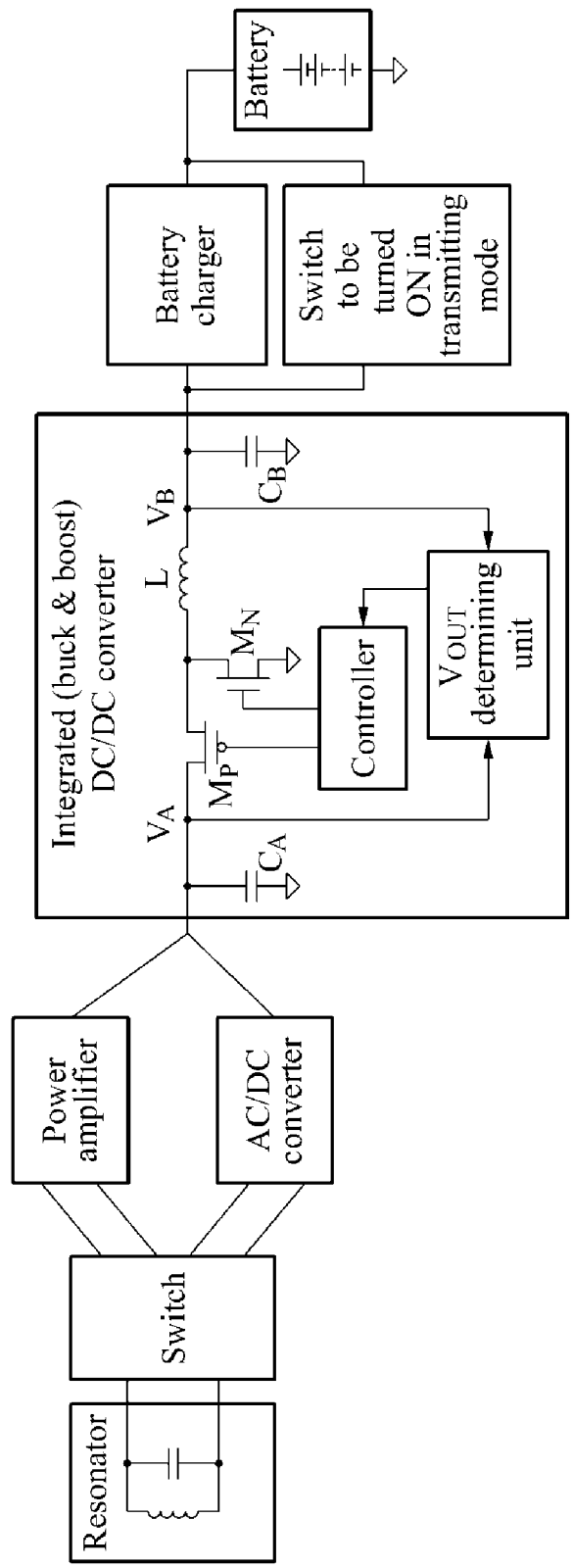
FIG. 10 is a block diagram illustrating yet another example of an apparatus for charge control.

FIG. 10 illustrates yet another example of an apparatus for charge control that may be used in a wireless charging system.

When compared to FIG. 9, when a battery charger is provided, a switch to connect the battery charger directly to an integrated DC/DC converter may be required for receiving a power supplied by a battery, in a transmitting mode.

Figure 11:
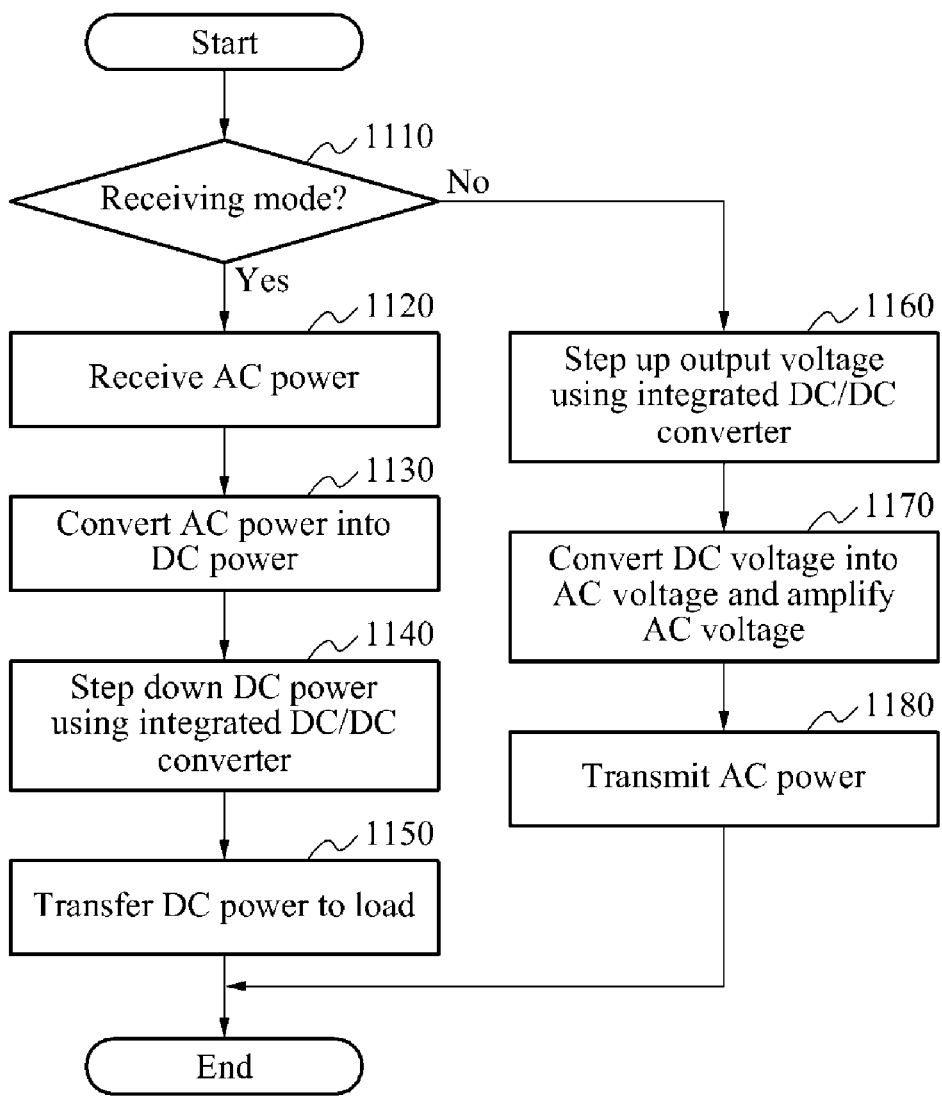
FIG. 11 is a flowchart illustrating an example of a method for charge control.

FIG. 11 illustrates an example of a method for charge control in a wireless charging system.

Referring to FIG. 11, in 1110, an apparatus for charge control in the wireless charging system determines whether to operate in a receiving mode. For example, the charge control apparatus may receive power wirelessly using a resonator in the receiving mode, and may transfer power wirelessly using the resonator in a transmitting mode. As an example, the charge control apparatus may determine whether to operate in the receiving mode, based on an amount of power stored in a battery.

In 1120, the charge control apparatus receives an AC power through the resonator when the charge control apparatus operates in the receiving mode. For example, the charge control apparatus may receive the AC power wirelessly through a mutual resonance.

In 1130, the charge control apparatus converts the AC power into a DC power. For example, the charge control apparatus may rectify the AC power.

In 1140, the charge control apparatus steps down a voltage level of the DC power to a voltage level required for charging a load, using an integrated DC/DC converter.

In 1150, the charge control apparatus transfers the stepped down voltage to the load.

In 1160, the charge control apparatus steps up a DC output voltage of the load to be greater than or equal to a DC supply voltage set in a power amplifier, using the integrated DC/DC converter.

In 1170, the charge control apparatus converts the DC voltage into an AC voltage, using the power amplifier, and amplifies the AC voltage based on an amount of power to be transferred through a mutual resonance.

In 1180, the charge control apparatus transmits the AC power to a wireless power receiver, through the mutual resonance of the resonator.

When the charge control apparatus is implemented, by greatly reducing a size of an integrated circuit and an external component, a size of the entire chip may be reduced exceedingly. Accordingly, the charge control apparatus may be applied in actuality by reducing a form factor, for example, a size, when a transmitting (TX) system and a receiving (RX) system are mounted in a single device in order to enable bidirectional wireless power transmission.

The charge control apparatus may be applied to all systems configured to charge other devices using a charged device wirelessly and thus, the utility of the charge control apparatus may be considerably great. For example, the charge control apparatus may be applied to an application for charging a cellular phone wirelessly in a potable tablet personal computer (PC) capable of wireless charging, and may also be applied for charging all devices requiring a power supply in an electrical vehicle (EV). In addition, the charge control apparatus may also be applied to a portable charger, and the like for charging a device inserted into a human body.

FIGS. 12A through 14B illustrates examples of applications in which an apparatus for charge control may be used in a wireless charging system.

Figure 12A:
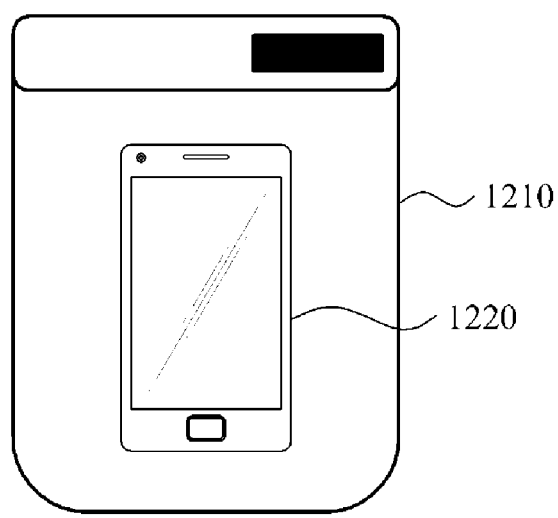
FIGS. 12A through 14B are diagrams illustrating examples of applications for an apparatus for charge control.
Figure 12B:
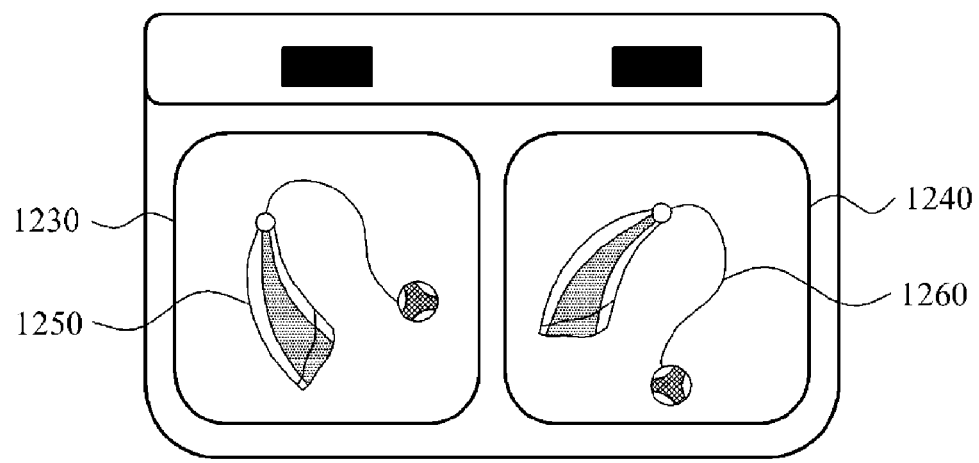

FIG. 12A illustrates wireless power charging between a pad 1210 and a mobile terminal 1220, and FIG. 12B illustrates wireless power charging between pads 1230 and 1240 and hearing aids 1250 and 1260.

Referring to FIG. 12A, a charge control apparatus may be mounted on, or installed within the pad 1210. Conversely, a charge control apparatus may be mounted on or installed in the mobile terminal 1220. In another example, the charge control apparatus may be disposed in a vicinity of the pad 1210 and the mobile terminal 1220. The pad 1210 may be a wireless power transmitter that charges the single mobile terminal 1220.

Referring to FIG. 12B, two hearing aids 1250 are mounted on the pad 1230 and the pad 1240, respectively. The hearing aid 1250 may correspond to a hearing aid for a left ear, and the hearing aid 1260 may correspond to a hearing aid for a right ear. Two charge control apparatuses may be mounted on or installed within the hearing aid 1250 and the hearing aid 1260, respectively. In another example, the charge control apparatus may be provided in a vicinity of both the hearing aids 1250, 1260 and the pads 1230, 1240.

Figure 13A:
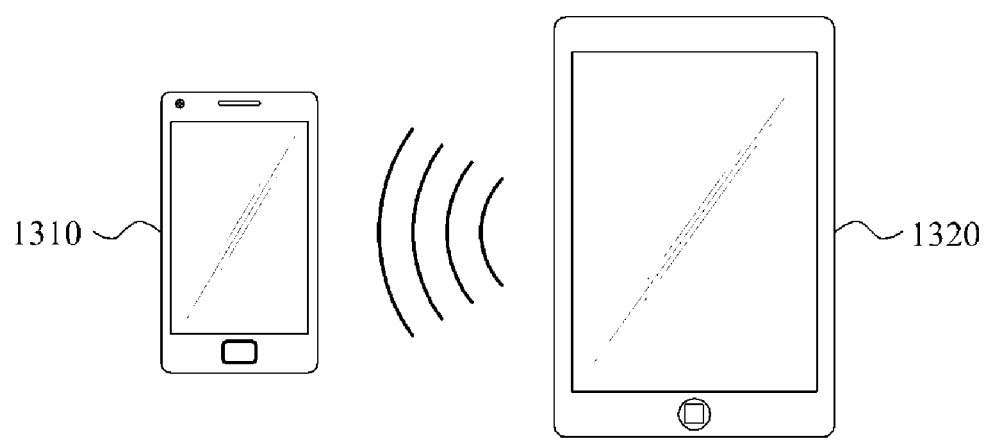
Figure 13B:
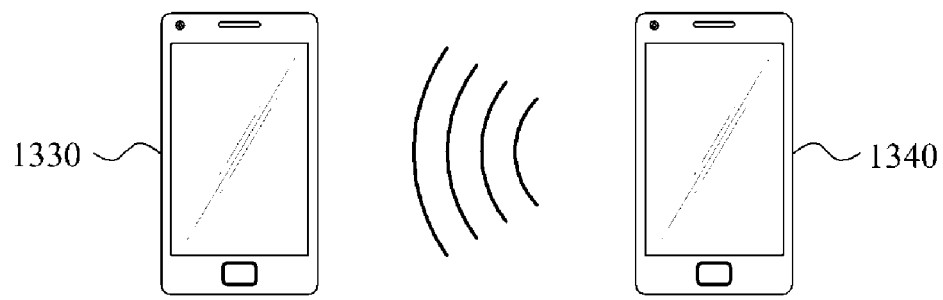

FIG. 13A illustrates wireless power charging between a mobile terminal 1310 and a tablet PC 1320, and FIG. 13B illustrates wireless power charging between a mobile terminal 1330 and a mobile terminal 1340. FIG. 13C illustrates wireless power charging between a mobile terminal 1350 and a mobile terminal 1360 via a charge control apparatus 1370.

Referring to FIG. 13A, a charge control apparatus may be mounted on or installed within the mobile terminal 1310. A charge control apparatus may be mounted on or installed within the tablet PC 1320. In another example, the charge control apparatus may be provided in a vicinity of the mobile terminal 1310 and the tablet PC 1320. The mobile terminal 1310 and the tablet PC 1320 may exchange power wirelessly.

Referring to FIG. 13B, a charge control apparatus may be mounted on or installed within the mobile terminal 1330. A charge control apparatus may be mounted on or installed within the mobile terminal 1340. The mobile terminal 1330 and the mobile terminal 1340 may exchange power wirelessly.

Referring to FIG. 13C, a mobile terminal 1350 and a mobile terminal 1360 may be charged via a charge control apparatus 1370 that is implemented separately. The charge control apparatus 1370 may include a battery system, a battery charger, or a battery 1380. The charge control apparatus 1370 may receive power wirelessly from the mobile terminal 1350, store the power in the battery 1380, and transmit the power wirelessly to the mobile terminal 1360. The charge control apparatus 1370 may, for example, have a structure of a charge control apparatus illustrated in FIG. 5.

Figure 14A:
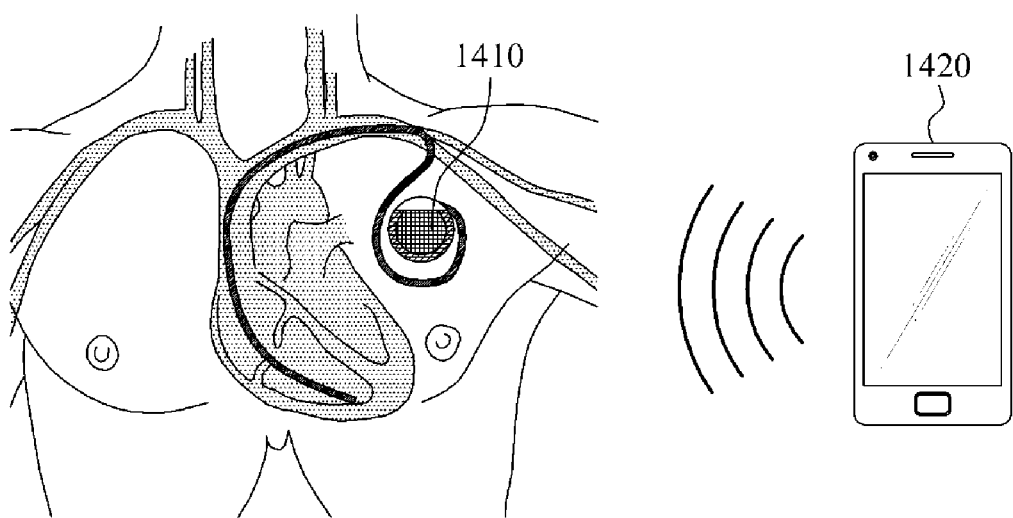
Figure 14B:
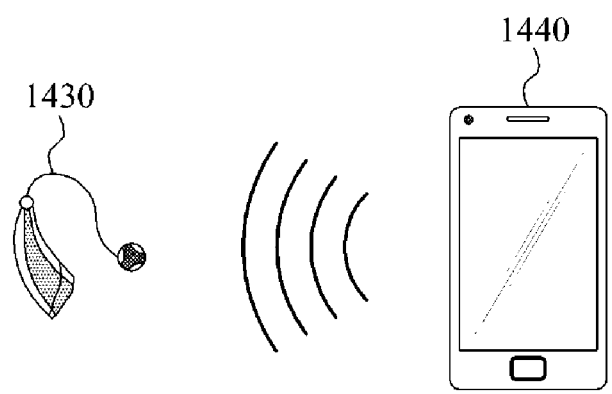

FIG. 14A illustrates wireless power charging between an electronic device 1410 inserted into a human body and a mobile device 1420, and FIG. 14B illustrates wireless power charging between a hearing aid 1430 and a mobile terminal 1440.

Referring to FIG. 14A, a charge control apparatus may be mounted on or installed within the mobile terminal 1420. A charge control apparatus may be mounted on or installed within the electronic device 1410. The electronic device 1410 may be charged by receiving power from the mobile terminal 1420.

Referring to FIG. 14B, a charge control apparatus may be mounted on or installed within the mobile terminal 1440. A charge control apparatus may be mounted on or installed within the hearing aid 1430. The hearing aid 1430 may be charged by receiving power from the mobile terminal 1430. In addition to the hearing aid 1430, low-power electronic devices, for example, a Bluetooth headset may be charged by receiving power from the mobile device 1440.

FIGS. 15A through 17B illustrate distribution of magnetic field in examples of resonators. The resonator illustrated in FIGS. 15A through 17B may be, for example, a source resonator or a target resonator. For example, the resonators illustrated in FIGS. 15A through 17B may be applied to the resonators of FIGS. 1 through 14B.

Figure 15A:
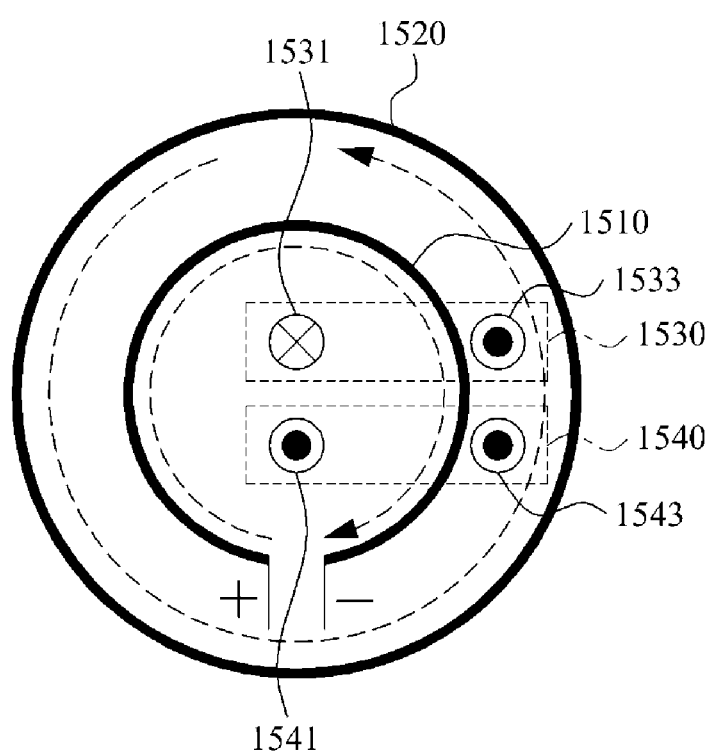
FIGS. 15A through 15B are diagrams illustrating distribution of magnetic field in an example of a feeder and an example of a resonator.

FIG. 15A illustrates the distribution of magnetic field in a feeder. When a resonator receives power supplied through a separate feeder, magnetic fields may form in both the feeder and the resonator.

Referring to FIG. 15A, a magnetic field 1530 may be formed as input current flows into a feeder 1510. A direction 1531 of the magnetic field 1530 within the feeder 1510 may have a phase that is opposite to a phase of a direction 1533 of the magnetic field 1530 outside the feeder 1510. The magnetic field 1530 formed by the feeder 1510 may induce a current to form inside a resonator 1520. The direction of the induced current may be opposite to a direction of the input current.

Due to the induced current, a magnetic field 1540 may form in the resonator 1520. Directions of a magnetic field formed due to induced current in all positions of the resonator 1520 may be the same. Accordingly, a direction 1541 of the magnetic field 1540 formed by the resonator 1520 may have the same phase as a direction 1543 of the magnetic field 1540 formed by the resonator 1520.

Thus, when the magnetic field 1530 formed by the feeder 1510 and the magnetic field 1540 formed by the resonator 1520 are combined, strength of the total magnetic field may decrease within the feeder 1510 however, the strength may increase outside the feeder 1510. In an example in which power is supplied to the resonator 1520 through the feeder 1510 configured as illustrated in FIG. 15A, the strength of the total magnetic field may decrease in the center of the resonator 1520, but may increase outside the resonator 1520. In another example in which a magnetic field is randomly distributed in the resonator 1520, it may be difficult to perform impedance matching because an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

Figure 15B:
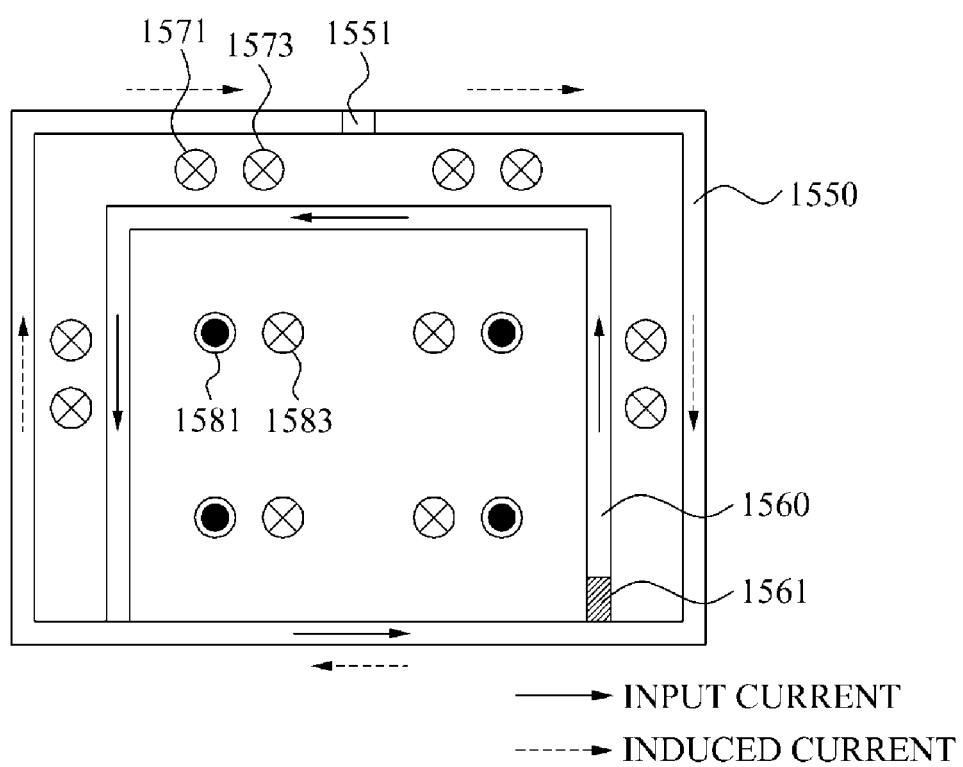

FIG. 15B illustrates an example of a structure of a wireless power transmitter in which a resonator 1550 and a feeder 1560 have a common ground. The resonator 1550 includes a capacitor 1551. The feeder 1560 may receive an input of a radio frequency (RF) signal via a port 1561.

For example, when the RF signal is input to the feeder 1560, input current may be generated in the feeder 1560. The input current flowing in the feeder 1560 may cause a magnetic field to form, and the magnetic field may generate a current in the resonator 1550 by induction. Additionally, another magnetic field may be formed due to the induced current flowing in the resonator 1550. In this example, a direction of the input current flowing in the feeder 1560 may have a phase opposite to a phase of a direction of the induced current flowing in the resonator 1550. Accordingly, in a region between the resonator 1550 and the feeder 1560, a direction 1571 of the magnetic field formed due to the input current may have the same phase as a direction 1573 of the magnetic field formed due to the induced current; thus, the strength of the total magnetic field may increase. Conversely, within the feeder 1560, a direction 1581 of the magnetic field formed due to the input current may have a phase opposite to a phase of a direction 1583 of the magnetic field formed due to the induced current, and thus the strength of the total magnetic field may decrease. Therefore, the strength of the total magnetic field may decrease in the center of the resonator 1550, but may increase outside the resonator 1550.

The feeder 1560 may determine an input impedance by adjusting an internal area of the feeder 1560. The input impedance refers to an impedance viewed in a direction from the feeder 1560 to the resonator 1550. When the internal area of the feeder 1560 is increased, the input impedance may be increased. Conversely, when the internal area of the feeder 1560 is reduced, the input impedance may be reduced. Because the magnetic field is randomly distributed in the resonator 1550 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance.

Figure 16A:
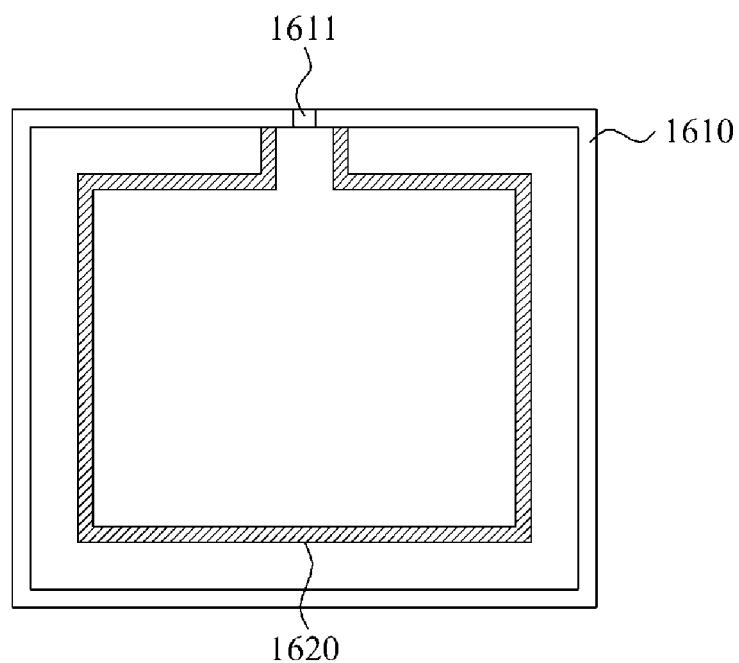
FIGS. 16A and 16B are diagrams illustrating an example of a wireless power transmitter.

FIG. 16A illustrates an example of a wireless power transmitter.

Referring to FIG. 16A, the wireless power transmitter includes a resonator 1610, and a feeding unit 1620. The resonator 1610 may further include a capacitor 1611. The feeding unit 1620 may be electrically connected to both ends of the capacitor 1611.

Figure 16B:
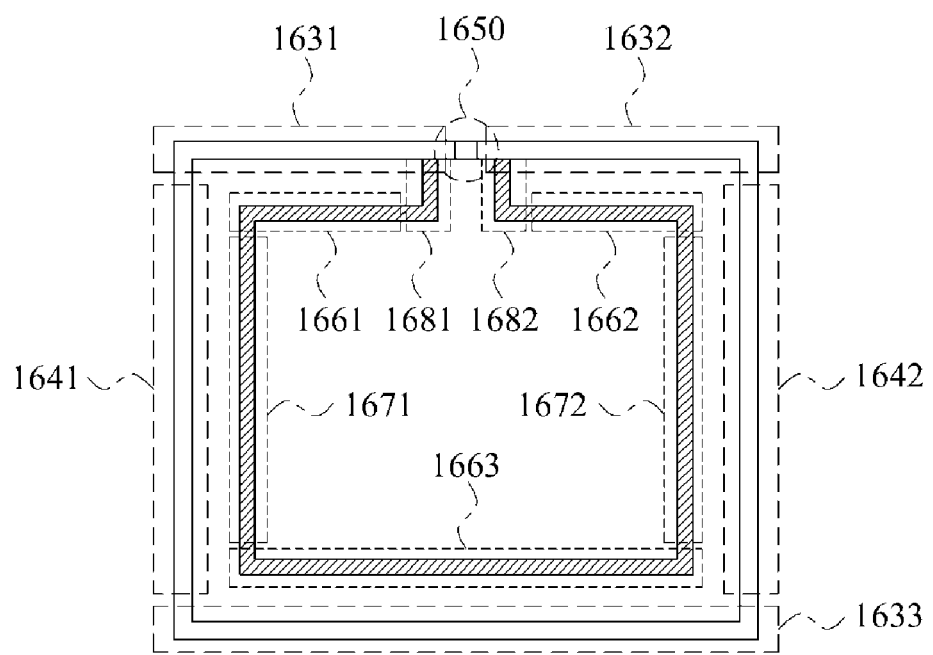

FIG. 16B illustrates structures of the wireless power transmitter illustrated in FIG. 16A. The resonator 1610 may include a first transmission line, a first conductor 1641, a second conductor 1642, and at least one first capacitor 1650.

The first capacitor 1650 may be inserted in series between a first signal conducting portion 1631 and a second signal conducting portion 1632 in the first transmission line, and an electric field may be confined within the first capacitor 1650. For example, the first transmission line may include at least one conductor in an upper portion of the first transmission line, and may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 1631 and the second signal conducting portion 1632. A conductor disposed in a lower portion of the first transmission line may be referred to as a first ground conducting portion 1633.

Referring to FIG. 16B, the resonator 1610 may have a substantially two-dimensional (2D) structure. The first transmission line may include the first signal conducting portion 1631 and the second signal conducting portion 1632 in the upper portion of the first transmission line. In addition, the first transmission line may include the first ground conducting portion 1633 in the lower portion of the first transmission line. The first signal conducting portion 1631 and the second signal conducting portion 1632 may face the first ground conducting portion 1633. Current may flow through the first signal conducting portion 1631 and the second signal conducting portion 1632.

Additionally, one end of the first signal conducting portion 1631 may be electrically connected (i.e., shorted) to the first conductor 1641, and another end of the first signal conducting portion 1631 may be connected to the first capacitor 1650. One end of the second signal conducting portion 1632 may be shorted to the second conductor 1642, and another end of the second signal conducting portion 1632 may be connected to the first capacitor 1650. Accordingly, the first signal conducting portion 1631, the second signal conducting portion 1632, the first ground conducting portion 1633, and the conductors 1641 and 1642 may be connected to each other, so that the resonator 1610 may have an electrically closed-loop structure. The term "loop structure" may include, for example, a polygonal structure such as a rectangular structure, octagonal structure and the like, and partially or entirely round structure, such as a circular structure, an elliptical structure and the like. "Having a loop structure" may indicate that the circuit is electrically closed.

The first capacitor 1650 may be inserted into an intermediate portion of the first transmission line. For example, the first capacitor 1650 may be inserted into a space between the first signal conducting portion 1631 and the second signal conducting portion 1632. The first capacitor 1650 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 1650 is inserted into the first transmission line, the resonator 1610 may have a characteristic of a metamaterial. A metamaterial refers to a material having a predetermined electrical property that is not discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials found in nature, a right hand rule may be applied to an electric field, a magnetic field, and a pointing vector; thus, the corresponding materials are referred to as right handed materials (RHMs). However, a metamaterial has a magnetic permeability or a permittivity absent in nature, and may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 1650 inserted as the lumped element is appropriately set, the resonator 1610 may have the characteristic of the metamaterial. Because the resonator 1610 may have a negative magnetic permeability by appropriately adjusting the capacitance of the first capacitor 1650, the resonator 1610 may also be referred to as an MNG resonator. Various criteria may be applied to determine the amount of capacitance of the first capacitor 1650. For example, the various criteria may include a criterion for enabling the resonator 1610 to have the characteristic of the metamaterial, a criterion for enabling the resonator 1610 to have a negative magnetic permeability in a target frequency, a criterion for enabling the resonator 1610 to have a zeroth order resonance characteristic in the target frequency, and the like. Based on at least one criterion among the aforementioned criteria, the capacitance of the first capacitor 1650 to be used may be determined.

The resonator 1610, also referred to as the MNG resonator 1610, may have a zeroth order resonance characteristic of having, as a resonance frequency, a frequency when a propagation constant is "0". Because the resonator 1610 may have a zeroth order resonance characteristic, the resonance frequency may be independent with respect to a physical size of the MNG resonator 1610. By appropriately designing or determining the configuration of the first capacitor 1650, the MNG resonator 1610 may sufficiently change the resonance frequency without changing the physical size of the MNG resonator 1610.

In a near field, for instance, the electric field may be concentrated on the first capacitor 1650 inserted into the first transmission line. Accordingly, due to the first capacitor 1650, the magnetic field may become dominant in the near field. The MNG resonator 1610 may have a relatively high Q-argument using the first capacitor 1650 of the lumped element; thus, it may be possible to enhance an efficiency of power transmission. For example, the Q-argument may indicate a level of an ohmic loss or a ratio of a reactance with respect to a resistance in the wireless power transmission. The efficiency of the wireless power transmission may increase according to an increase in the Q-argument.

Although not illustrated in FIG. 16B, a magnetic core may be further provided to pass through the MNG resonator 1610. The magnetic core may perform a function of increasing a power transmission distance.

Referring to FIG. 16B, the feeding unit 1620 may include a second transmission line, a third conductor 1671, a fourth conductor 1672, a fifth conductor 1681, and a sixth conductor 1682.

The second transmission line may include a third signal conducting portion 1661 and a fourth signal conducting portion 1662 in an upper portion of the second transmission line. In addition, the second transmission line may include a second ground conducting portion 1663 in a lower portion of the second transmission line. The third signal conducting portion 1661 and the fourth signal conducting portion 1662 may face the second ground conducting portion 1663. Current may flow through the third signal conducting portion 1661 and the fourth signal conducting portion 1662.

Additionally, one end of the third signal conducting portion 1661 may be shorted to the third conductor 1671, and another end of the third signal conducting portion 1661 may be connected to the fifth conductor 1681. One end of the fourth signal conducting portion 1662 may be shorted to the fourth conductor 1672, and another end of the fourth signal conducting portion 1662 may be connected to the sixth conductor 1682. The fifth conductor 1681 may be connected to the first signal conducting portion 1631, and the sixth conductor 1682 may be connected to the second signal conducting portion 1632. The fifth conductor 1681 and the sixth conductor 1682 may be connected in parallel to both ends of the first capacitor 1650. In this example, the fifth conductor 1681 and the sixth conductor 1682 may be used as input ports to receive an RF signal as an input.

Accordingly, the third signal conducting portion 1661, the fourth signal conducting portion 1662, the second ground conducting portion 1663, the third conductor 1671, the fourth conductor 1672, the fifth conductor 1681, the sixth conductor 1682, and the resonator 1610 may be connected to each other, so that the resonator 1610 and the feeding unit 1620 may have an electrically closed-loop structure. The term "loop structure" may include, for example, a polygonal structure such as a rectangular structure, an octagonal structure and the like, or a partially or entirely round structure such as a circular structure, an elliptical structure and the like. When an RF signal is received via the fifth conductor 1681 or the sixth conductor 1682, input current may flow in the feeding unit 1620 and the resonator 1610, a magnetic field may form due to the input current. The magnetic field may generate a current in the resonator 1610 by induction. A direction of the input current flowing in the feeding unit 1620 may be the same as a direction of the induced current flowing in the resonator 1610. Thus, strength of the total magnetic field may increase in the center of the resonator 1610, but may decrease outside the resonator 1610.

An input impedance may be determined based on an area of a region between the resonator 1610 and the feeding unit 1620; accordingly, a separate matching network used to match the input impedance to an output impedance of a power amplifier may not be required. For example, even when the matching network is used, the input impedance may be determined by adjusting a size of the feeding unit 1620; thus, a structure of the matching network may be simplified. The simplified structure of the matching network may minimize a matching loss of the matching network.

The second transmission line, the third conductor 1671, the fourth conductor 1672, the fifth conductor 1681, and the sixth conductor 1682 may form the same structure as the resonator 1610.

Figure 17A:
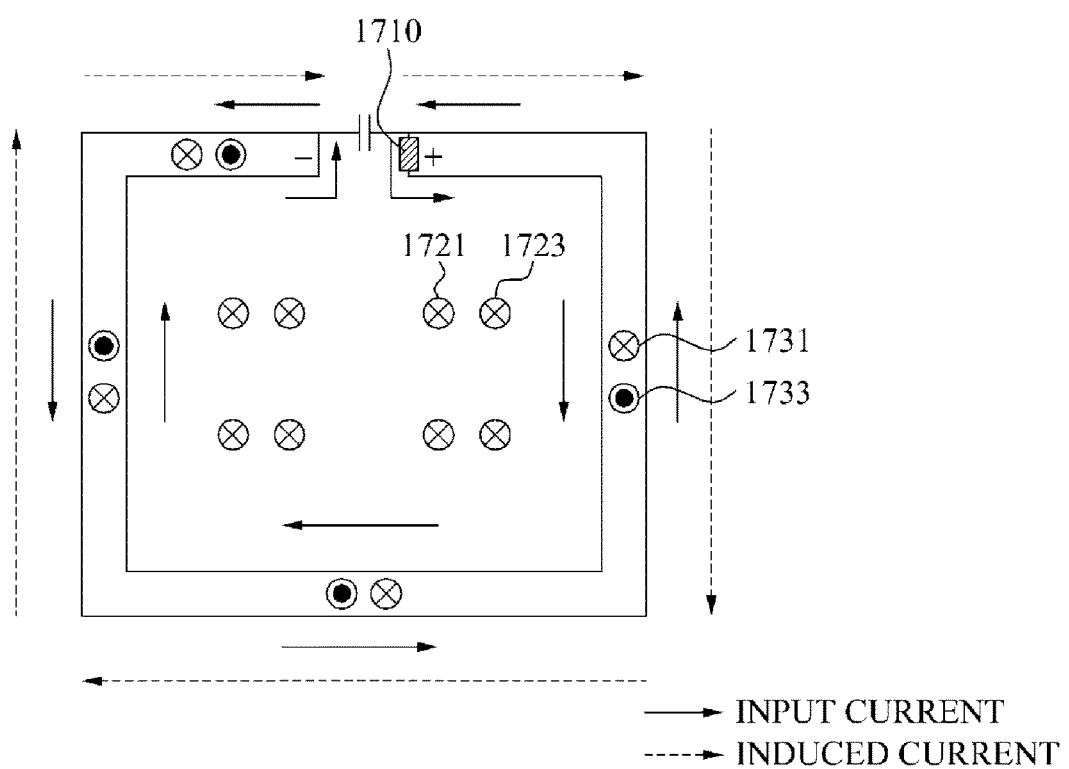
FIG. 17A is a diagram illustrating distribution of magnetic field within an example of a resonator based on feeding of a feeding unit.
Figure 17B:
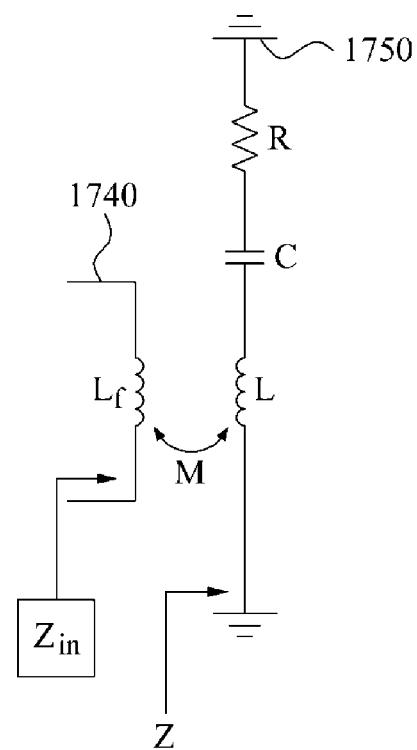
FIG. 17B is a diagram illustrating examples of equivalent circuits of a feeding unit and a resonator.

FIG. 17A illustrates an example of a distribution of a magnetic field within a resonator based on feeding of a feeding unit. In other words, FIG. 17A more briefly illustrates the resonator 1610 and the feeding unit 1620 of FIG. 16A, and FIG. 17B illustrates one equivalent circuit of a feeding unit 1740, and one equivalent circuit of a resonator 1750.

A feeding operation may refer to supplying power to a source resonator in wireless power transmission, or refer to supplying AC power to a rectification unit in a wireless power transmission. FIG. 17A illustrates a direction of input current flowing in the feeding unit, and a direction of induced current induced in the source resonator. Additionally, FIG. 17A illustrates a direction of a magnetic field formed due to the input current of the feeding unit, and a direction of a magnetic field formed due to the induced current of the source resonator.

Referring to FIG. 17A, the fifth conductor 1681 or the sixth conductor 1682 of the feeding unit 1620 may be used as an input port 1710. The input port 1710 may receive an RF signal as an input. The RF signal may be output from a power amplifier. The power amplifier may increase or decrease an amplitude of the RF signal based on a demand by a target device. The RF signal received by the input port 1710 may be displayed in the form of input current flowing in the feeding unit. The input current may flow in a clockwise direction in the feeding unit, along a transmission line of the feeding unit. The fifth conductor of the feeding unit may be electrically connected to the resonator. For example, the fifth conductor may be connected to a first signal conducting portion of the resonator. Accordingly, the input current may flow in the resonator, as well as, in the feeding unit. The input current may flow in a counterclockwise direction in the resonator. The input current flowing in the resonator may cause a magnetic field to form. The magnetic field may generate current in the resonator by induction. The induced current may flow in a clockwise direction in the resonator. For example, the induced current may transfer energy to a capacitor of the resonator, and a magnetic field may form due to the induced current. In this example, the input current flowing in the feeding unit and the resonator is indicated by a solid line of FIG. 17A, and the induced current flowing in the resonator is indicated by a dotted line of FIG. 17A.

A direction of a magnetic field formed due to a current may be determined based on the right hand rule. Referring to FIG. 17A, within the feeding unit, a direction 1721 of a magnetic field formed due to the input current flowing in the feeding unit may be identical to a direction 1723 of a magnetic field formed due to the induced current flowing in the resonator. Accordingly, the strength of the total magnetic field may increase within the feeding unit.

In a region between the feeding unit and the resonator, a direction 1733 of a magnetic field formed due to the input current flowing in the feeding unit has a phase opposite to a phase of a direction 1731 of a magnetic field formed due to the induced current flowing in the source resonator, as illustrated in FIG. 17A. Accordingly, the strength of the total magnetic field may decrease in the region between the feeding unit and the resonator.

In general, a strength of a magnetic field decreases in the center of a resonator with the loop structure, and increases outside the resonator. However, referring to FIG. 17A, the feeding unit may be electrically connected to both ends of a capacitor of the resonator, and accordingly the induced current of the resonator may flow in the same direction as the input current of the feeding unit. Since the induced current of the resonator flows in the same direction as the input current of the feeding unit, the strength of the total magnetic field may increase within the feeding unit, and may decrease outside the feeding unit. As a result, the strength of the total magnetic field may increase in the center of the resonator with the loop structure, and may decrease outside the resonator, due to the feeding unit. Thus, the strength of the total magnetic field may be equalized within the resonator.

The power transmission efficiency for transferring a power from the source resonator to a target resonator may be in proportion to the strength of the total magnetic field formed in the source resonator. In other words, when the strength of the total magnetic field increases in the center of the resonator, the power transmission efficiency may also increase.

Referring to FIG. 17B, the feeding unit 1740 and the resonator 1750 may be expressed as equivalent circuits. An example of an input impedance Zin viewed in a direction from the feeding unit 1740 to the resonator 1750 may be computed, as given in Equation 1.

$$Z_{in} = \frac{(\omega M)^2}{Z}$$ [Equation 1]

In Equation 1, M denotes a mutual inductance between the feeding unit 1740 and the resonator 1750, ω denotes a resonance frequency between the feeding unit 1740 and the resonator 1750, and Z denotes an impedance viewed in a direction from the resonator 1750 to a target device. The input impedance Zin may be in proportion to the mutual inductance M. Accordingly, the input impedance Zin may be controlled by adjusting the mutual inductance M. The mutual inductance M may be adjusted based on an area of a region between the feeding unit 1740 and the resonator 1750. The area of the region between the feeding unit 1740 and the resonator 1750 may be adjusted based on a size of the feeding unit 1740. Accordingly, the input impedance Zin may be determined based on the size of the feeding unit 1740, and thus a separate matching network may not be required to perform impedance matching with an output impedance of a power amplifier.

In a target resonator and a feeding unit that are included in a wireless power receiver, a magnetic field may be distributed as illustrated in FIG. 17A. For example, the target resonator may receive wireless power from a source resonator through magnetic coupling. Due to the received wireless power, induced current may be generated in the target resonator. A magnetic field formed due to the induced current in the target resonator may cause another induced current to be generated in the feeding unit. In this example, when the target resonator is connected to the feeding unit as illustrated in FIG. 17A, the induced current generated in the target resonator may flow in the same direction as the induced current generated in the feeding unit. Thus, the strength of the total magnetic field may increase within the feeding unit, but may decrease in a region between the feeding unit and the target resonator.

Figure 18:
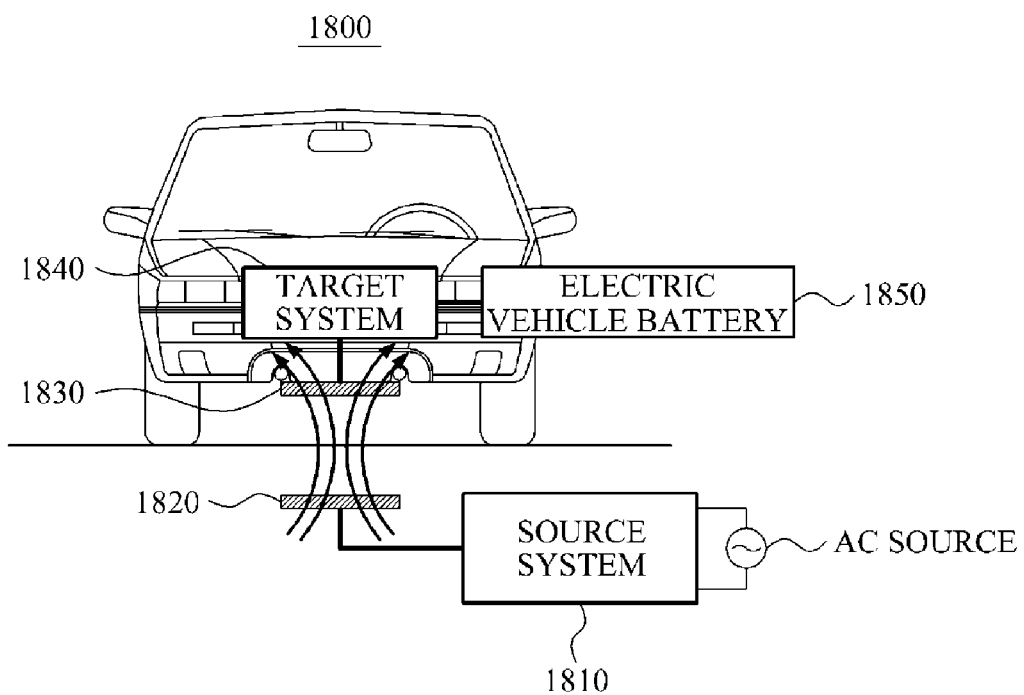
FIG. 18 is a diagram illustrating an example of an electric vehicle charging system.

FIG. 18 illustrates an example of an electric vehicle charging system.

Referring to FIG. 18, an electric vehicle charging system 1800 includes a source system 1810, a source resonator 1820, a target resonator 1830, a target system 1840, and an electric vehicle battery 1850. The electronic vehicle charging system 1800 may include an apparatus for charge control during a charging operation between the electric vehicle battery 1850 and the source system 1810.

The electric vehicle charging system 1800 may have a similar structure to the wireless charging system illustrated in FIG. 1. The source system 1810 and the source resonator 1820 in the electric vehicle charging system 1800 may function as a source. The target resonator 1830 and the target system 1840 in the electric vehicle charging system 1800 may function as a target.

The source system 1810 may include a variable SMPS, a power amplifier, a matching network, a controller, and a communication unit, similarly to the source 110 illustrated in FIG. 1. The target system 1840 may include a matching network, a rectification unit, a DC/DC converter, a communication unit, and a controller, similarly to the target 180 illustrated in FIG. 1.

The electric vehicle battery 1850 may be charged by the target system 1840.

The electric vehicle charging system 1800 may use a resonant frequency in a band of a few KHz to tens of MHz to transmit power wirelessly.

The source system 1810 may generate power, based on a type of charging vehicle, a capacity of a battery, and a charging state of a battery, and may supply the generated power to the target system 1840.

The source system 1810 may control the source resonator 1820 and the target resonator 1830 to be aligned. For example, when the source resonator 1820 and the target resonator 1830 are not aligned, the controller of the source system 1810 may transmit a message to the target system 1840, and may control alignment between the source resonator 1820 and the target resonator 1830.

For example, when the target resonator 1830 is not located in a position enabling maximum magnetic resonance, the source resonator 1820 and the target resonator 1830 may not be aligned. When a vehicle does not stop accurately, the source system 1810 may induce a position of the vehicle to be adjusted, and may control the source resonator 1820 and the target resonator 1830 to be aligned. In another example, the position of the source resonator 1820 may be adjusted to align the source resonator 1820 to the target resonator 1830 of the vehicle.

The source system 1810 and the target system 1840 may transmit or receive an ID of a vehicle, or may exchange various messages, through communication.

The descriptions of examples of apparatus for charge control illustrated in FIGS. 2 through 17B may be applied to the electric vehicle charging system 1800. For example, the source system 1810 may include an apparatus for charge control. In another example, the target system 1840 of the electric vehicle may include an apparatus for charge control.

Because more power is required to charge an electric vehicle than consumer electronic products, the electric vehicle charging system 1800 may use a resonant frequency in a band of a few KHz to tens of MHz, and may transmit power that is equal to or higher than tens of watts to charge the electric vehicle battery 1850.

Described above is an example of an apparatus for charge control in a wireless charging system, the apparatus including an alternating current-to-direct current (AC/DC) converter configured to convert an AC power received wirelessly through a mutual resonance into a DC power, in a receiving mode, an integrated DC-to-DC (DC/DC) converter configured to step down a voltage level of the DC power to a voltage level required by a load in the receiving mode, and to step up an output voltage level of the load to be greater than or equal to a supply voltage level set in a power amplifier in a transmitting mode, and the power amplifier configured to convert the DC voltage stepped up by the integrated DC/DC converter into an AC voltage based on a resonant frequency, and to amplify the converted AC voltage, in the transmitting mode.

The integrated DC/DC converter may include a first capacitor connected in parallel to at least one of the AC/DC converter and the power amplifier, a second capacitor connected in parallel to the load, a first transistor of a P-channel metal oxide semiconductor (PMOS) type, the first transistor connected in series to the first capacitor, a second transistor of an N-channel metal oxide semiconductor (NMOS) type, the second transistor connected in parallel to the first transistor, an inductor connected in series to the second transistor, and an output voltage determining unit configured to determine a voltage applied to the second capacitor to be an output voltage of the integrated DC/DC converter in the receiving mode, and to determine a voltage applied to the first capacitor to be an output voltage of the integrated DC/DC converter in the transmitting mode.

The apparatus may include a controller configured to activate the receiving mode by connecting the AC/DC converter to the integrated DC/DC converter in order to charge the load, and to activate the transmitting mode by connecting the integrated DC/DC converter to the power amplifier in order to transmit power stored in the load, based on an amount of power stored in the load. Here, the receiving mode and the transmitting mode may not be activated simultaneously.

The controller may be configured to connect the first transistor and the second transistor to the second capacitor for the voltage applied to the second capacitor to be fed back to the first transistor and the second transistor in the receiving mode.

The controller may be configured to connect the first transistor and the second transistor to the first capacitor for the voltage applied to the first capacitor to be fed back to the first transistor and the second transistor in the transmitting mode.

The load may include a battery charger configured to charge a battery by storing the DC voltage stepped down by the integrated DC/DC converter, the battery configured to be charged by the battery charger in the receiving mode, and to transfer a DC voltage to the integrated DC/DC converter in the transmitting mode, and a first switch unit configured to connect the battery charger to the battery in the receiving mode, and to break the connection between the battery charger and the battery and connect the integrated DC/DC converter to the battery in the transmitting mode.

The apparatus may further include a resonator configured to receive the AC power through a mutual resonance with a wireless power transmitter in the receiving mode, and to transmit the AC power amplified by the power amplifier through a mutual resonance with a wireless power receiver in the transmitting mode.

The apparatus may further include a second switch unit configured to connect the resonator to the AC/DC converter in the receiving mode, and to break the connection between the resonator and the AC/DC converter and connect the resonator to the power amplifier in the transmitting mode.

In another example, there is provided an apparatus for charge control in a wireless charging system, the apparatus including a rectification unit configured to convert an AC power received wirelessly through a mutual resonance into a DC power, in a receiving mode, a first DC/DC converter configured to step down a voltage level of the DC power to a voltage level required by a load in the receiving mode, a second DC/DC converter configured to step up an output voltage level of the load to be greater than or equal to a supply voltage level set in a power amplifier in a transmitting mode, and the power amplifier configured to convert the DC voltage stepped up by the second DC/DC converter into an AC voltage based on a resonant frequency, and to amplify the converted AC voltage, in the transmitting mode.

The apparatus may further include a resonator configured to receive the AC power through a mutual resonance with a wireless power transmitter in the receiving mode, and to transmit the AC power amplified by the power amplifier through a mutual resonance with a wireless power receiver in the transmitting mode, a first switch unit configured to connect the resonator to the rectification unit in the receiving mode, and to connect the resonator to the power amplifier in the transmitting mode, a second switch unit configured to connect the load to the second DC/DC converter in the transmitting mode, and a controller configured to control operations of the first switch unit and the second switch unit, based on an amount of power stored in the load.

The load may include a battery charger configured to charge a battery by storing the DC voltage stepped down by the first DC/DC converter, and the battery configured to be charged by the battery charger in the receiving mode, and to transfer a DC voltage to the second DC/DC converter in the transmitting mode.

In still another example, there is provided a method for charge control in a wireless charging system, the method including converting an AC power received wirelessly through a mutual resonance into a DC power, in a receiving mode, stepping down a voltage level of the DC power to a voltage level required by a load, using an integrated DC/DC converter in the receiving mode, stepping up an output voltage level of the load to be greater than or equal to a supply voltage level set in a power amplifier, using the integrated DC/DC converter in a transmitting mode, and converting the stepped down DC voltage into an AC voltage based on a resonant frequency, and amplifying the converted AC voltage, in the transmitting mode.

The method may further include determining one of the receiving mode and the transmitting mode for an apparatus for charge control in a wireless charging system, based on an amount of power stored in the load.

The stepping down may include determining a voltage applied to the load to be an output voltage of the integrated DC/DC converter in the receiving mode.

The stepping up may include determining a voltage applied to the power amplifier to be an output voltage of the integrated DC/DC converter in the transmitting mode.

The method may further include receiving the AC power through a mutual resonance between a resonator and a wireless power transmitter in the receiving mode, and transmitting the AC power amplified by the power amplifier through a mutual resonance between the resonator and a wireless power receiver in the transmitting mode.

Examples of charge control apparatuses that operate in relay modes will be described with reference to FIGS. 19A to 24.

Figure 19A:
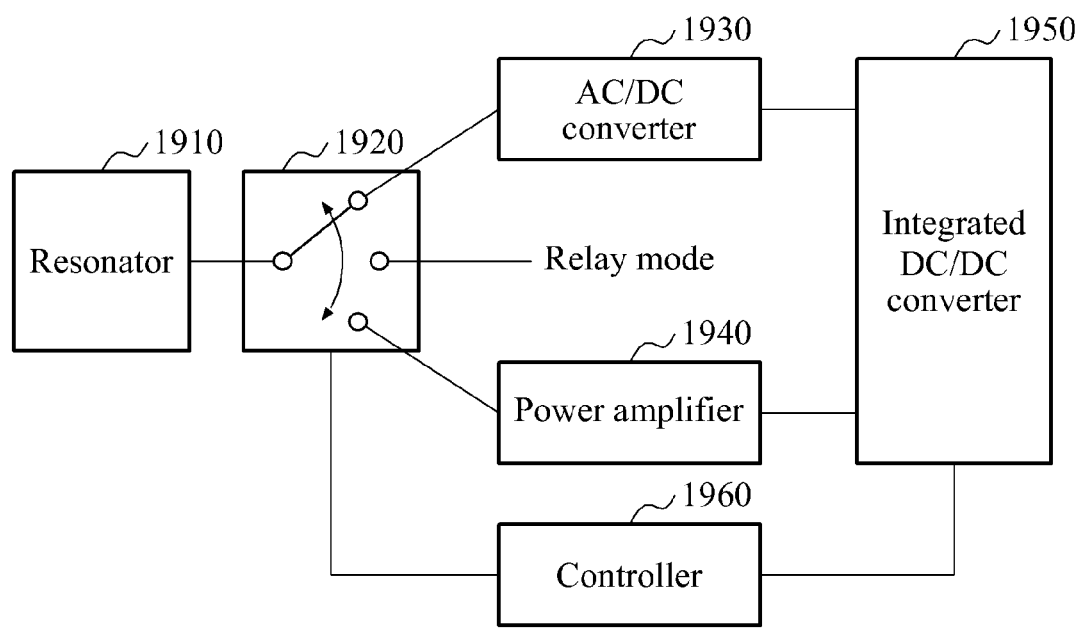
FIGS. 19A and 19B are block diagrams illustrating other examples of apparatuses of charge control in a wireless charging system.
Figure 19B:
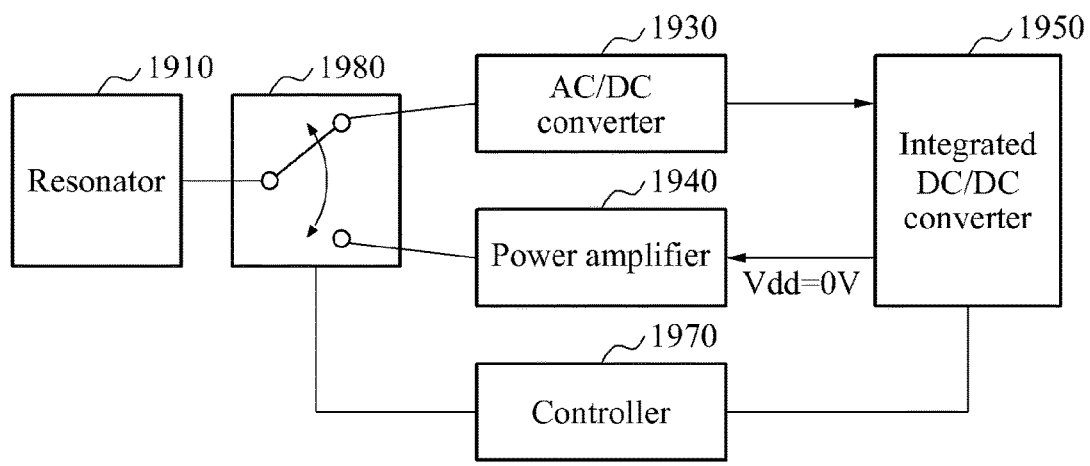

FIGS. 19A and 19B illustrate examples of charge control apparatuses in a wireless charging system.

Referring to FIG. 19A, an example of a charge control apparatus includes a resonator 1910, a switch 1920, an AC/DC converter 1930, a power amplifier 1940, an integrated DC/DC converter 1950, and a controller 1960.

The controller 1960 may determine a mode of the charge control apparatus to be one of a receiving mode, a relay mode, and a transmitting mode, based on a user input. In another example, the controller 1960 may terminate the receiving mode when charging of a battery is completed, and control the charge control apparatus to operate in the relay mode or the transmitting mode.

The controller 1960 may control a connection of the switch 1920 based on the receiving mode, the relay mode, and the transmitting mode. In the receiving mode, the resonator 1910 and the AC/DC converter 1930 may be connected by the switch 1920. In the relay mode, the resonator 1910 may be connected to an open port by the switch 1920 such that an impedance of the resonator 1910 may increase. In the transmitting mode, the resonator 1910 may be connected to the power amplifier 1940. Although FIG. 19A illustrates the switch 1920 as having three ports, various types of switches having an open port may be used.

In the relay mode, when the impedance of the resonator 1910 increases, a large portion of the power input into the resonator 1910 may be reflected by the resonator 1910. An amount of the power reflected by the resonator 1910 may be transferred to another terminal. In the relay mode, the charge control apparatus may reflect the input power using the resonator 1910 and transfer the power to the other terminal, rather than receiving the power.

The integrated DC/DC converter 1950 may step down a voltage level of a DC signal output from the AC/DC converter 1930 to a voltage level required by a load, in the receiving mode, and step up a voltage level output from the load to be greater than or equal to a support voltage level set in the power amplifier 1940, in the transmitting mode.

The descriptions provided with reference to FIGS. 3A and 3B may be applied to the AC/DC converter 1930, the power amplifier 1940, and the integrated DC/DC converter 1950.

Referring to FIG. 19B, the relay mode may be applied as an example of the transmitting mode. For example, a controller 1970 may control the integrated DC/DC converter 1950 to provide a supply voltage Vdd of "0" V while a mode is set to be the transmitting mode. Such a state may correspond to the relay mode. When a supply voltage of "0" V is applied to the power amplifier 1940, the power amplifier 1940 may not operate such that the impedance of the resonator 1910 may increase. As the impedance of the resonator 1910 increases, a large portion of the power input into the resonator 1910 may be reflected by the resonator 1910. The amount of power reflected by the resonator 1910 may be transferred to another terminal.

Figure 20:
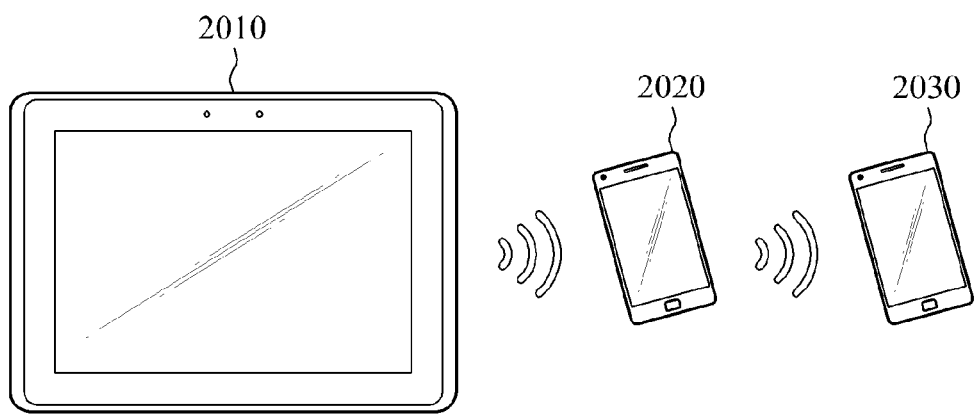
FIG. 20 is a diagram illustrating an example of an apparatus for charge control in a wireless charging system in a relay mode.
Figure 21:
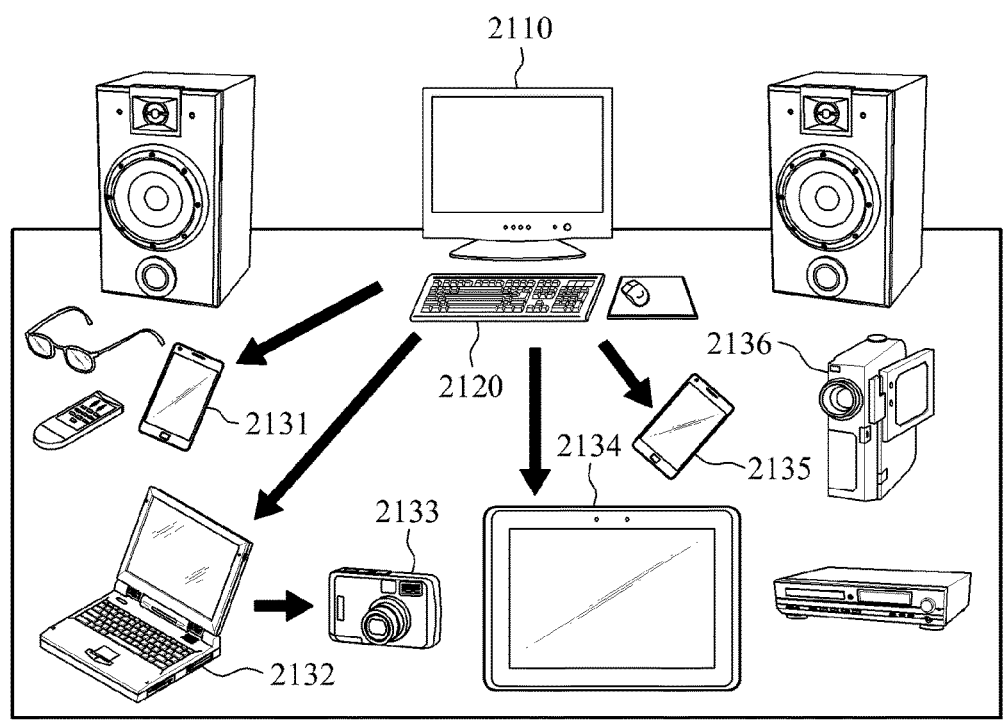
FIG. 21 is a diagram illustrating another example of an apparatus for charge control in a wireless charging system.

FIGS. 20 and 21 illustrate examples of charge control apparatuses in a wireless charging system.

Referring to FIG. 20, a smart phone 2020 may operate in a relay mode. The smart phone 2020 may reflect a power input from a tablet 2010 and transfer the power to a smart phone 2030. The configurations of charge control apparatuses illustrated in FIGS. 19A and 19B may be included in the smart phone 2020.

Referring to FIG. 21, a TV 2110 may be charged using a cable, and transfer power wirelessly to other devices. A keyboard 2120 may operate in the relay mode. The keyboard 2120 may reflect a power input from the TV 2110, and transfer the power to a smart phone 2131, a laptop computer 2132, a camera 2133, a tablet 2134, a smart phone 2135, and a camcorder 2136. As the keyboard 2120 operates in the relay mode, a transmission range of the power provided by the TV 2110 may increase to be greater than or equal to a predetermined efficiency. In addition to the keyboard 2120, various types of portable electronic devices may operate in the relay mode. The configurations of FIGS. 19A and 19B may be mounted on the keyboard 2120. In another example, the configurations of FIGS. 19A and 19B may be mounted on one of the smart phone 2131, the laptop computer 2132, the camera 2133, the tablet 2134, the smart phone 2135, and the camcorder 2136.

Figure 22:
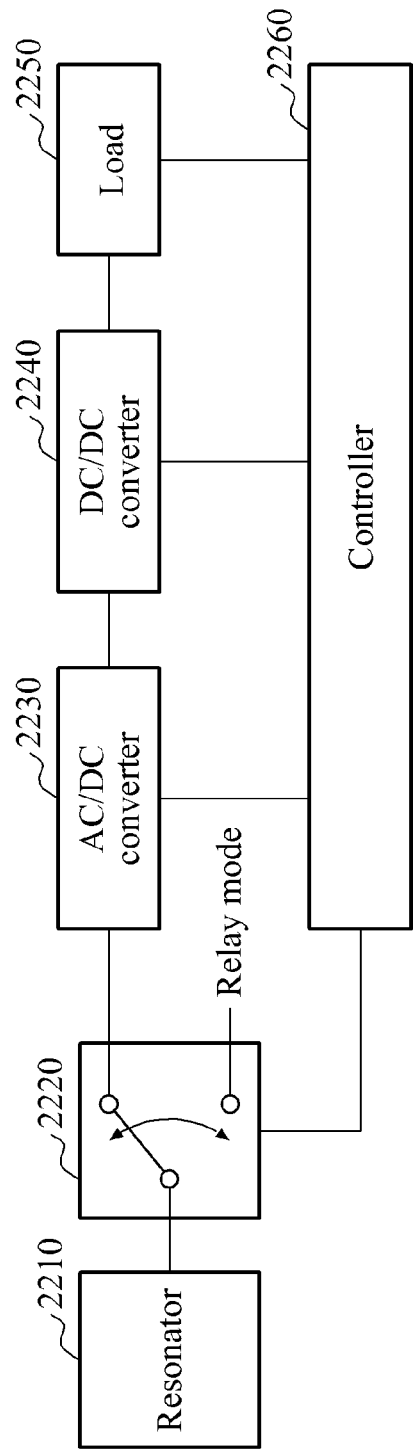
FIG. 22 is a block diagram illustrating an example of an apparatus for charge control in a wireless charging system operable in a receiving mode or a relay mode.

FIG. 22 is a block diagram illustrating an example of a charge control apparatus in a wireless charging system operable in a receiving mode or a relay mode.

Referring to FIG. 22, the charge control apparatus includes a resonator 2210, a switch 2220, an AC/DC converter 2230, a DC/DC converter 2240, a load 2250, and a controller 2260.

The controller 2260 may determine a mode of the charge control apparatus to be one of a receiving mode and a relay mode, based on a user input. In another example, the controller 2260 may terminate the receiving mode when charging of a battery is completed, and control the charge control apparatus to operate in the relay mode.

The controller 2260 may control a connection of the switch 2220 based on the receiving mode, or based on the relay mode. In the receiving mode, the resonator 2210 and the AC/DC converter 2230 may be connected by the switch 2220. In the relay mode, the resonator may be connected to an open port, and an impedance of the resonator 2210 may increase.

In the relay mode, when the impedance of the resonator 2210 increases, a large portion of a power input into the resonator 2210 may be reflected by the resonator 2210. An amount of the power reflected by the resonator 2210 may be transferred to another terminal. In the relay mode, the charge control apparatus may reflect the input power using the resonator 2210 and transfer the power to another terminal, rather than receiving the power.

In the receiving mode, the DC/DC converter 2240 may step down a voltage level of a DC signal output from the AC/DC converter 2230 to a voltage level required by the load 2250.

In the receiving mode, the AC/DC converter 2230 may rectify a power received at the resonator 2210, and convert the received power to a DC signal.

Figure 23A:
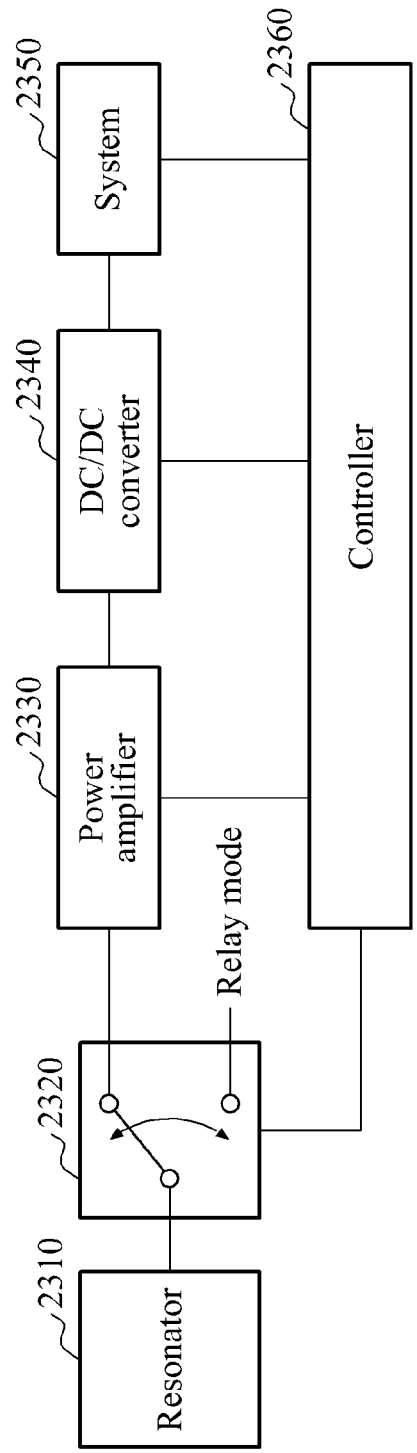
FIGS. 23A and 23B are block diagrams illustrating examples of apparatuses for charge control in a wireless charging system operable in a transmitting mode or a relay mode.
Figure 23B:
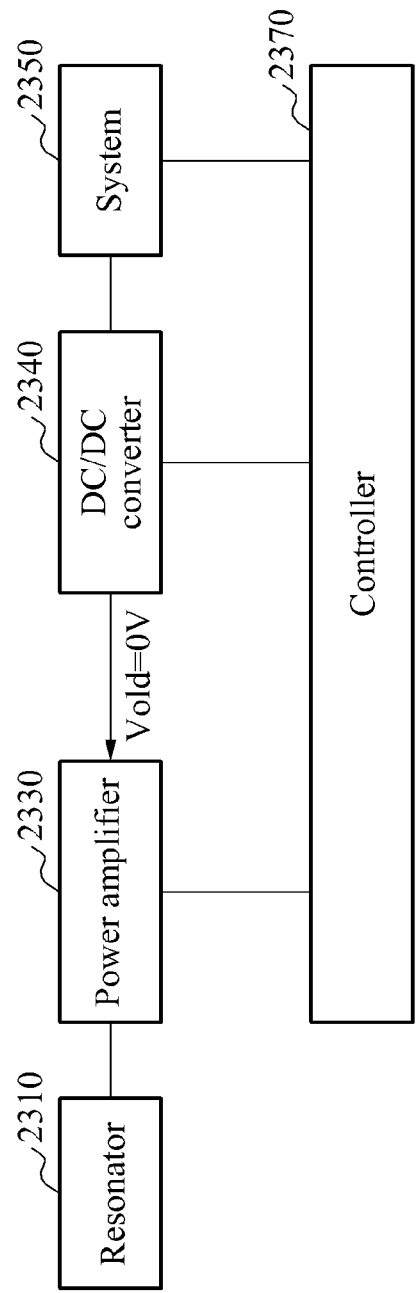

FIGS. 23A and 23B are block diagrams illustrating examples of apparatuses for charge control in a wireless charging system operable in a transmitting mode or a relay mode.

Referring to FIG. 23A, the charge control apparatus includes a resonator 2310, a switch 2320, a power amplifier 2230, a DC/DC converter 2340, a system 2350, and a controller 2360.

The controller 2360 may determine a mode of the charge control apparatus to be one of a transmitting mode and a relay mode, based on a user input. For example, the system

2350 may supply power through an electric plug using a cable. In another example, the system 2350 may include a battery.

The controller 2360 may control a connection of the switch 2320 based on whether the mode is the transmitting mode or the relay mode. In the transmitting mode, the resonator 2310 may be connected to the power amplifier 2340 by the switch 2320. In the relay mode, the resonator 2310 may be connected to an open port by the switch, and an impedance of the resonator 2310 may increase.

In the relay mode, when the impedance of the resonator 2310 increases, a large portion of a power input into the resonator 2310 may be reflected by the resonator 2310. An amount of the power reflected by the resonator 2310 may be transferred to another terminal. In the relay mode, the charge control apparatus may reflect the input power using the resonator 2310 and transfer the power to another terminal.

In the transmitting mode, the DC/DC converter 2340 may step up a voltage level output from the system to be greater than or equal to a supply voltage level set in the power amplifier 2330.

The power amplifier 2330 may convert the DC voltage stepped up by the DC/DC converter 2340 to an AC voltage based on a resonant frequency, and amplify the converted AC voltage. The power amplifier 2330 may adjust an amplification level based on an amount of power to be transmitted using the resonator 2310. The power amplifier 2330 may perform an operation of a DC/AC converter converting a DC voltage to an AC voltage using a resonant frequency of the resonator 2310.

Referring to FIG. 23B, the relay mode may be implemented without use of a switch. For example, in the transmitting mode, the controller 2370 may control the DC/DC converter 2340 to provide a supply voltage Vdd of "0" V. Such a state may correspond to the relay mode. When a supply voltage of "0" V is applied to the power amplifier 2330, the power amplifier 2330 may not operate and the impedance of the resonator 2310 may increase. As the impedance of the resonator 2310 increases, a large portion of the power input into the resonator 2310 may be reflected by the resonator 2310. An amount of the power reflected by the resonator 2310 may be transferred to another terminal. By applying the scheme of FIG. 23B, the relay mode may be implemented without use of a switch.

Figure 24:
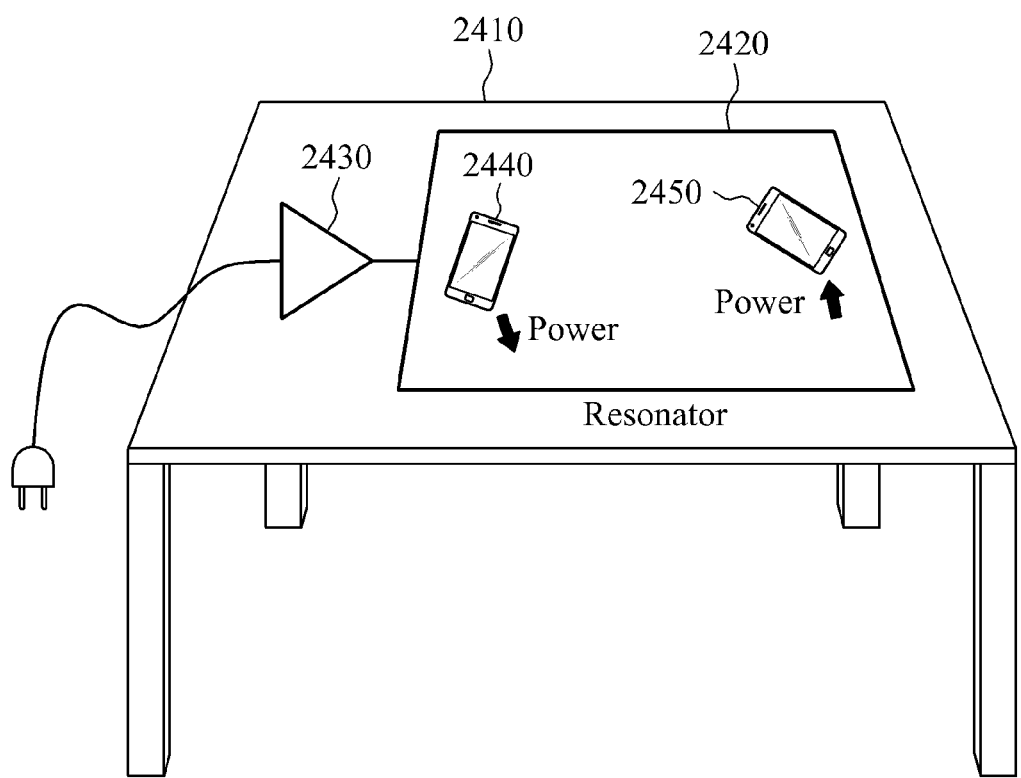
FIG. 24 is a diagram illustrating an example of an apparatus for charge control in a wireless charging system operable in a transmitting mode or a relay mode.

FIG. 24 is a diagram illustrating an example of a charge control apparatus in a wireless charging system that operates in a transmitting mode or a relay mode.

Referring to FIG. 24, the charge control apparatus may be disposed in an inner portion or a lower portion of a table 2410. The charge control apparatus of FIG. 24 may include the configurations illustrated in FIGS. 23A and 23B.

The charge control apparatus may transmit a power provided through the power amplifier 2430 using the resonator 2420, in the transmitting mode. The power transmitted using the resonator may be transferred to a smart phone 2440 and a smart phone 2450. The smart phone 2440 and the smart phone 2450 may be examples of portable terminals. Various types of portable devices may be used as devices configured to transmit, relay or receive power wirelessly.

When the charge control apparatus operates in the relay mode, the power transmitted from the smart phone 2440 may be reflected by the resonator 2420 and be transferred to the smart phone 2450.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more non-transitory computer readable recording mediums.

As a non-exhaustive illustration only, a mobile terminal described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device for charge control, the electronic device comprising:
  a direct current-to-direct current (DC/DC) converter configured to step down a voltage level of a DC power outputted from a rectifier of the electronic device to a voltage level for a load of the electronic device and to step up an output voltage level of a DC power from the load to be greater than or equal to a supply voltage level for a power amplifier of the electronic device; and
  the power amplifier configured to convert a DC voltage stepped up by the DC/DC converter into an alternating current (AC) voltage and to amplify the converted AC voltage,
  wherein the DC/DC converter is further configured to step down the voltage level of the DC power outputted from the rectifier in a power receiving mode and to step up the output voltage level of the DC power from the load in a power transmitting mode,
  wherein the DC/DC converter comprises:
  a first capacitor connected to the power amplifier;
  a second capacitor connected to the load; and
  an output voltage determining unit configured to determine a voltage applied to the first capacitor to be an output voltage of the DC/DC converter in the transmitting mode, and to determine a voltage applied to the second capacitor to be an output voltage of the DC/DC converter in the receiving mode.

2. The electronic device of claim 1, wherein
  the rectifier is configured to convert an AC power received wirelessly into the DC power in the receiving mode.

3. The electronic device of claim 2, wherein the first capacitor is connected in parallel to the power amplifier;
  the second capacitor is connected in parallel to the load; and
  the DC/DC converter further comprises;
  a first transistor of a P-channel metal oxide semiconductor (PMOS) type, the first transistor connected in series to the first capacitor;
  a second transistor of an N-channel metal oxide semiconductor (NMOS) type, the second transistor connected in parallel to the first transistor; and
  an inductor connected in series to the second transistor.

4. The electronic device of claim 3, wherein the DC/DC converter further comprises:
  a driving voltage determining unit configured to compare the voltage applied to the second capacitor to the voltage applied to the first capacitor and determine a higher voltage to be a driving voltage of the output voltage determining unit.

5. The electronic device of claim 3, further comprising:
  a third switch unit configured to connect the rectifier to the DC/DC converter in the receiving mode to charge the load with a power, and connect the DC/DC converter to the power amplifier in the transmitting mode to transmit the power stored in the load.

6. The electronic device of claim 3, further comprising:
  a controller configured to control an operating time of the first transistor based on a difference between a voltage required by the load and the voltage applied to the second capacitor in the receiving mode.

7. The electronic device of claim 6, wherein the controller is further configured to control the operating time of the first transistor based on a difference between a supply voltage set in the power amplifier and the voltage applied to the first capacitor.

8. The electronic device of claim 2, wherein the load comprises:
  a battery charger configured to charge a battery by storing the DC voltage stepped down by the DC/DC converter;
  the battery configured to be charged by the battery charger in the receiving mode, and to transfer a DC voltage to the DC/DC converter in the transmitting mode; and
  a first switch unit configured to connect the battery charger to the battery in the receiving mode, and to break the connection between the battery charger and the battery and connect the DC/DC converter to the battery in the transmitting mode.

9. The electronic device of claim 2, further comprising:
  a power transceiver configured to receive the AC power from a wireless power transmitting device in the receiving mode, and to transmit the AC power amplified by the power amplifier to a wireless power receiving device in the transmitting mode.

10. The electronic device of claim 9, further comprising:
  a second switch unit configured to connect the power transceiver to the rectifier in the receiving mode, and to break the connection between the power transceiver and the rectifier and connect the power transceiver to the power amplifier in the transmitting mode.

11. A method for charge control, the method comprising:
  converting an alternating current (AC) power received wirelessly into a direct current (DC) power;
  stepping down a voltage level of the DC power to a voltage level for a load, using a direct current-to-direct current (DC/DC) converter;
  stepping up an output voltage level of a DC power from the load to be greater than or equal to a supply voltage level for a power amplifier using the DC/DC converter; and
  converting the stepped up voltage level into an AC voltage and amplifying the converted AC voltage,
  wherein the DC/DC converter is configured to step down a voltage level of a DC power in a power receiving mode and to step up the output voltage level of a DC power from the load in a power transmitting mode, and
  wherein the DC/DC converter comprises;
  a first capacitor connected to the power amplifier;
  a second capacitor connected to the load; and
  an output voltage determining unit configured to determine a voltage applied to the first capacitor to be an output voltage of the DC/DC converter in the transmitting mode, and to determine a voltage applied to the second capacitor to be an output voltage of the DC/DC converter in the receiving mode.

12. The method of claim 11, further comprising:
  determining one of the receiving mode and the transmitting mode for charge control in a wireless charging system.

13. The method of claim 11, wherein the stepping down comprises determining a voltage applied to the load to be the output voltage of the DC/DC converter in the receiving mode.

14. The method of claim 13, wherein the stepping up comprises determining a voltage applied to the power amplifier to be the output voltage of the DC/DC converter in the transmitting mode.

15. The method of claim 11, further comprising:
receiving the AC power through a mutual resonance between a power transceiver and a wireless power transmitting device in the receiving mode; and
transmitting the AC power amplified by the power amplifier through a mutual resonance between the power transceiver and a wireless power receiving device in the transmitting mode.

* * * * *